United States Patent
Shimizu et al.

(10) Patent No.: US 6,512,537 B1
(45) Date of Patent: Jan. 28, 2003

(54) MOTION DETECTING APPARATUS, MOTION DETECTING METHOD, AND STORAGE MEDIUM STORING MOTION DETECTING PROGRAM FOR AVOIDING INCORRECT DETECTION

(75) Inventors: Kazuhito Shimizu, Nagoya (JP); Shuji Inoue, Zama (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/324,437

(22) Filed: Jun. 1, 1999

(30) Foreign Application Priority Data

Jun. 3, 1998 (JP) .......................................... 10-172155

(51) Int. Cl.$^7$ ................................................ H04N 7/18
(52) U.S. Cl. ........................ 348/155; 348/152; 348/700
(58) Field of Search ................................ 348/143, 210, 348/152, 154, 155, 699, 700; 382/107, 278, 240, 260; 358/105, 136

(56) References Cited

U.S. PATENT DOCUMENTS

| | | | | |
|---|---|---|---|---|
| 4,691,230 A | * | 9/1987 | Kaneko et al. ............. | 358/105 |
| 5,387,947 A | * | 2/1995 | Shin ............................ | 348/699 |
| 5,926,209 A | * | 7/1999 | Glatt ........................... | 348/143 |
| 6,081,606 A | * | 6/2000 | Hansen et al. .............. | 382/107 |
| 6,130,707 A | * | 10/2000 | Koller et al. ............... | 348/155 |

FOREIGN PATENT DOCUMENTS

JP            6334991            12/1994

OTHER PUBLICATIONS

Test Model Editing Committee, International Organisation for Standardisation, ISO–IEC/JTC1/SCS9/WG11, Coded Representation of Picture and Audio Information, Document AVC–491, Versions1, Apr. 1993.

* cited by examiner

*Primary Examiner*—Chris Kelley
*Assistant Examiner*—Charles Parsons

(57) ABSTRACT

To provide a motion detecting apparatus that judges whether each macro block shows a part of an object in motion using motion vectors calculated by a general-purpose MPEG video encoder during motion compensation. The motion detecting apparatus compares a motion vector of a present macro block with motion vectors of macro blocks surrounding the present macro block. If the motion vector of the present macro block and the motion vectors of the surrounding macro blocks are not random in direction and magnitude, the motion detecting apparatus judges that the present macro block shows a part of an object in motion. Otherwise, the motion detecting apparatus judges that the present macro block does not show a part of an object in motion.

40 Claims, 16 Drawing Sheets

MOTION DETECTING APPARATUS, MOTION DETECTING METHOD, AND STORAGE MEDIUM STORING MOTION DETECTING PROGRAM FOR AVOIDING INCORRECT DETECTION

This application is based on an application No. 10-172155 filed in Japan, the content of which is hereby incorporated by reference.

BACKGROUND OF THE INVENTION

1. Field of the Invention

The present invention relates to a motion detecting apparatus, a motion detecting method, and a storage medium storing a motion detecting program for detecting motion of objects using motion vectors obtained by a MPEG video encoder.

2. Description of the Prior Art

With extension of business hours in stores and increase in the number of unattended facilities, the demand for reinforcing crime prevention measures in such stores and facilities is growing these days. As a representative measure, one or more surveillance cameras are placed in a store so that the security personnel can monitor images taken by the cameras.

However, this method is problematic as it requires the security personnel to constantly watch the surveillance cameras long hours. To lessen the workload for the security personnel, a conventional motion detecting apparatus is used for detecting motion of objects such as persons in images taken by a surveillance camera. When motion is detected on the camera, the security personnel is alerted by an alarm attached to the motion detecting apparatus and watches pertinent images, with it being possible to reduce the load of constantly watching the camera.

This conventional motion detecting apparatus uses a background difference method to detect motion of an object.

The background difference method compares a present frame taken by a surveillance camera with a frame preceding the present frame and detects motion when the two frames differ. To be more specific, the motion detecting apparatus calculates a difference of luminance between the two frames in units of pixels and, when the calculated difference is larger than a threshold value, judges the difference as motion. The threshold value is used here to prevent small picture jitter or solar irradiation change from being detected as motion.

On the other hand, a MPEG (Moving Picture Experts Group) technique for coding images using a MPEG method is becoming increasingly common in recent years. In this technique motion vectors are calculated during image coding. A motion detecting apparatus that detects motion using these motion vectors is also conventionally used.

A motion vector shows the spatial correlation between a target block and a prediction block. Here, one block is composed of 16×16 or 8×8 pixels. The target block is a block in a frame (target frame) which is to be coded. The prediction block is a block selected from another frame which is temporally close to the target frame. To select the prediction block, the other frame or a predetermined search area in the other frame is searched for a block closely analogous to the target block. In the case of static images, a magnitude of a motion vector of the target block is 0, since a position of the target block in the target frame is identical to a position of the prediction block in the other frame. In the case of moving images, the target block and the prediction block often show one part of movement of the same object. Accordingly, a motion vector of the target block shows the magnitude and direction of the movement of the object. In brief, the motion detecting apparatus that uses motion vectors detects motion if a motion vector of a block has a certain magnitude. More specifically, the motion detecting apparatus checks whether the motion vector of the block has a magnitude larger than a threshold value which has been set in consideration of image jitter or the like, and detects motion if the magnitude is larger than the threshold value.

In motion detection techniques it is desirable to detect only movements of objects. However, when luminance greatly changes due to strong flicker of a fluorescent lamp or light incident from a motor vehicle during night, a flat area which actually does not show an object in motion may be detected in the above conventional background difference method and motion detecting method using motion vectors. The flat area referred to here is an area, such as a wall or a floor, where luminance is relatively even in a frame.

SUMMARY OF THE INVENTION

In view of the above problem, the present invention aims to provide a motion detecting apparatus, a motion detecting method, and a storage medium storing a motion detecting program that can prevent strong flicker or light flash in a flat area from being detected as motion.

The stated object can be fulfilled by a motion detecting apparatus, connected to a video encoder which sequentially compression-codes images inputted from a camera, for detecting motion of objects in the images, the motion detecting apparatus including: an acquiring unit for acquiring a plurality of motion vectors calculated by the video encoder respectively for a plurality of blocks and storing the plurality of motion vectors of the respective plurality of blocks in a memory; a first judging unit for detecting motion vectors whose magnitudes are larger than a threshold value among the plurality of motion vectors in the memory and judging blocks corresponding to the detected motion vectors as possible motion blocks; and a second judging unit for judging, when a motion vector of a present block and motion vectors of blocks surrounding the present block have non-random directions and non-random magnitudes, the present block as a motion block, wherein the present block is selected from the possible motion blocks one by one, and wherein the motion block shows a part of an object in motion.

With this construction, when luminance greatly changes in a fairly short time due to light flash or strong flicker, the mistake of detecting a flat area (such as a wall or a floor where luminance is relatively even) can be avoided.

Assume an image is classified under an image area that shows an object in motion (motion area) and an image area that does not show an object in motion, the latter being further classified under an image area that shows a flat part (flat area) and an image area that shows a nonflat part (nonflat area). In the presence of light flash or strong flicker, magnitudes and directions of motion vectors are even in the motion area, magnitudes and directions of motion vectors are random in the flat area, and magnitudes of motion vectors are 0 in the nonflat area.

With conventional motion detecting apparatus that detects motion whenever magnitudes of motion vectors are large, not only the motion area but also the flat area is mistakenly detected under the above circumstances.

On the other hand, the motion detecting apparatus of the present invention detects motion in consideration of not only magnitudes of motion vectors but also uniformity of the motion vectors in direction and magnitude, so that the flat area which does not show an object in motion will not be mistakenly detected.

Also, since the acquiring unit in the motion detecting apparatus acquires motion vectors from the video encoder, the motion detecting apparatus itself does not need to calculate these motion vectors. Accordingly, it is unnecessary to equip the motion detecting apparatus with a dedicated motion vector calculating device, thereby realizing the motion detection with a simple configuration using a conventional video encoder.

Here, the motion detecting apparatus may further include: an area storing unit for storing a critical area set in a frame; an area judging unit for judging whether at least one of motion blocks found by the second judging unit is present within the critical area; and an alarm generating unit for generating an alarm depending on a judgement result of the area judging unit.

With this construction, only when the area judging unit judges that a motion block exists within the critical area, the security personnel is alerted by the alarm generating unit to watch images in question, so that the load of constantly watching images can be reduced. Further, since incorrect detection of a flat area caused by light flash or strong flicker is suppressed as a result of the judgement by the second judging unit. Accordingly, an alarm will not be mistakenly generated by incorrect detection and so the workload for the security personnel can further be reduced.

Here, the area storing unit may further store a critical direction corresponding to the critical area, wherein the area judging unit judges, when the motion blocks are present within the critical area, whether an average direction of motion vectors of the motion blocks is roughly similar to the critical direction.

With this construction, an alarm is generated only when there is movement in the critical direction within the critical area. Accordingly, it is possible to design such a motion detection apparatus that generates an alarm when, for instance, an intrusion through an entrance into a store or an approach toward a cash box is detected. Thus, the workload for the security personnel can further be reduced.

The above object can also be fulfilled by a motion detecting apparatus, connected to a video encoder which sequentially compression-codes images inputted from a camera, for detecting motion of objects in the images, the motion detecting apparatus including: an acquiring unit for acquiring a motion vector calculated by the video encoder for each of a plurality of blocks from the video encoder together with a first difference sum-total and a second difference sum-total of the block, and storing the motion vector, the first difference sum-total, and the second difference sum-total of the block in a memory, the first difference sum-total, expressed as AE0, being a sum-total of differences in luminance values of corresponding pixels between the block and a rectangle area which is present in a reference frame and corresponds to the block, and the second difference sum-total, expressed as AE, being a sum-total of differences in luminance values of corresponding pixels between the block and a rectangle area which is present in the reference frame and is directed to by the motion vector of the block; a first judging unit for judging blocks, among the plurality of blocks, which each satisfy AE0−AE>α, as possible motion blocks, α being a threshold value; and a second judging unit for judging, when a motion vector of a present block and motion vectors of blocks surrounding the present block have non-random directions and non-random magnitudes, the present block as a motion block, wherein the present block is selected from the possible motion blocks one by one, and wherein the motion block shows a part of an object in motion.

With this construction, the first judging unit judges a block as a possible motion block when a difference between a first difference sum-total and a second difference sum-total of the block is larger than a threshold value. Accordingly, it is possible to prevent incorrect detection of a block in a flat area (where luminance is even) in the presence of small flicker.

When an image is classified as a motion area, a flat area, or a nonflat area, motion vectors with substantial magnitudes are detected in the motion area and the flat area in the presence of small flicker. With the conventional motion detecting apparatus that focuses on magnitudes of motion vectors, such a flat area is mistakenly detected as motion of an object.

In contrast, the motion detecting apparatus of the present uses the property that, while a difference between a zero difference sum-total and a minimum difference sum-total is small in the flat area and the nonflat area, the difference is large in the motion area. That is, the first judging unit detects motion depending on whether the difference is larger than the threshold value, thereby preventing the flat area from being detected by mistake.

In addition, the second judging unit judges the present block as a motion block when a direction and magnitude of a motion vector of the present block are roughly similar to motion vectors of blocks surrounding the present block. Accordingly, it is possible to avoid the mistake of detecting the flat area under circumstances where luminance greatly changes due to light flash or strong flicker.

Here, the motion detecting apparatus may further include a third judging unit for rejudging, when the present block judged by the second judging unit as the motion block satisfies $|AE0-AE|/(|MVx|+|MVy|+1) \geq \beta$, the present block as the motion block, where MVx is a horizontal component of the motion vector of the present block, MVy is a vertical component of the motion vector of the present block, and β is a threshold value.

According to the above property that the difference between the zero difference sum-total and the minimum difference sum-total is small in the flat area, the third judging unit judges the present block as a motion block only when the above formula is satisfied. As a result, incorrect detection is further avoided.

Here, the motion detecting apparatus may further include a fourth judging unit for rejudging, when the blocks surrounding the present block rejudged by the third judging unit as the motion block are not motion blocks and the present block satisfies $|MVx|+|MVy| \leq \gamma$, the present block as the motion block, γ being a threshold value, wherein the fourth judging unit also rejudges the present block as the motion block when at least one of the blocks surrounding the present block is a motion block.

It is assumed that an image area showing a relatively large object (such as a person) in motion is made up of a plurality of motion blocks. In other words, a block whose surrounding blocks are not motion blocks and whose motion vector has a large magnitude is not a part of an image area showing an object in motion. Accordingly, the fourth judging unit rejudges the present block that satisfies the above formula as a motion block, to further prevent incorrect motion detection.

The above object can also be fulfilled by a computer-readable storage medium storing a motion detecting program for detecting, through use of motion vectors outputted from a video encoder which sequentially compression-codes images inputted from a camera, motion of objects in the images, the motion detecting program including: an acquiring step for acquiring a plurality of motion vectors calculated by the video encoder respectively for a plurality of blocks and storing the plurality of motion vectors of the respective plurality of blocks in a memory; a first judging step for detecting motion vectors whose magnitudes are larger than a threshold value among the plurality of motion vectors in the memory and judging blocks corresponding to the detected motion vectors as possible motion blocks; and a second judging step for judging, when a motion vector of a present block and motion vectors of blocks surrounding the present block have non-random directions and non-random magnitudes, the present block as a motion block, wherein the present block is selected from the possible motion blocks one by one, and wherein the motion block shows a part of an object in motion.

With the above procedure, when luminance greatly changes in a fairly short time due to light flash or strong flicker, the mistake of detecting a flat area (such as a wall or a floor where luminance is relatively even) can be avoided.

The above object can also be fulfilled by a computer-readable storage medium storing a motion detecting program for detecting, through use of motion vectors outputted from a video encoder which sequentially compression-codes images inputted from a camera, motion of objects in the images, the motion detecting program including: an acquiring step for acquiring a motion vector calculated by the video encoder for each of a plurality of blocks from the video encoder together with a first difference sum-total and a second difference sum-total of the block, and storing the motion vector, the first difference sum-total, and the second difference sum-total of the block in a memory, the first difference sum-total, expressed as AE0, being a sum-total of differences in luminance values of corresponding pixels between the block and a rectangle area which is present in a reference frame and corresponds to the block, and the second difference sum-total, expressed as AE, being a sum-total of differences in luminance values of corresponding pixels between the block and a rectangle area which is present in the reference frame and is directed to by the motion vector of the block; a first judging step for judging blocks, among the plurality of blocks, which each satisfy AE0−AE>α, as possible motion blocks, α being a threshold value; and a second judging step for judging, when a motion vector of a present block and motion vectors of blocks surrounding the present block have non-random directions and non-random magnitudes, the present block as a motion block, wherein the present block is selected from the possible motion blocks one by one, and wherein the motion block shows a part of an object in motion.

With the above procedure, the first judging step judges a block as a possible motion block when a difference between a first difference sum-total and a second difference sum-total of the block is larger than a threshold value. Accordingly, it is possible to prevent incorrect detection of a block in a flat area (where luminance is even) in the presence of small flicker.

The above object can also be fulfilled by a motion detecting method for detecting, through use of motion vectors outputted from a video encoder which sequentially compression-codes images inputted from a camera, motion of objects in the images, the motion detecting method including: an acquiring step for acquiring a plurality of motion vectors calculated by the video encoder respectively for a plurality of blocks and storing the plurality of motion vectors of the respective plurality of blocks in a memory; a first judging step for detecting motion vectors whose magnitudes are larger than a threshold value among the plurality of motion vectors in the memory and judging blocks corresponding to the detected motion vectors as possible motion blocks; and a second judging step for judging, when a motion vector of a present block and motion vectors of blocks surrounding the present block have non-random directions and non-random magnitudes, the present block as a motion block, wherein the present block is selected from the possible motion blocks one by one, and wherein the motion block shows a part of an object in motion.

With the above procedure, when luminance greatly changes in a fairly short time due to light flash or strong flicker, the mistake of detecting a flat area (such as a wall or a floor where luminance is relatively even) can be avoided.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT(S)

First Embodiment

The following is a description of a motion detecting apparatus of the first embodiment of the present invention with reference to figures.

Figure 1:
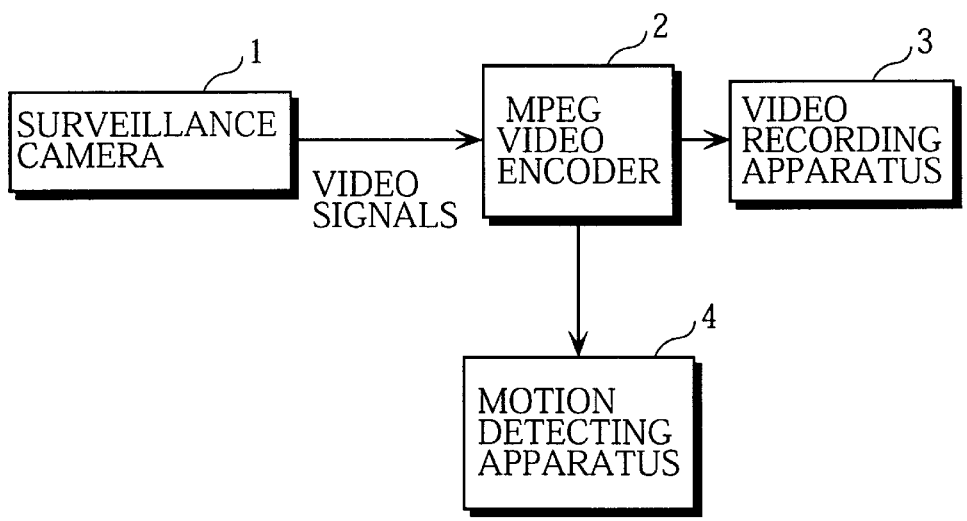
FIG. 1 is a block diagram showing the general configuration of a motion detecting system made up of a motion detecting apparatus of the present invention and its peripheral apparatuses.

FIG. 1 is a block diagram showing the general configuration of a motion detecting system that includes a motion detecting apparatus and its peripheral apparatuses.

In the figure, the motion detecting system is roughly made up of a surveillance camera 1, a MPEG video encoder 2, a video recording apparatus 3, and a motion detecting apparatus 4.

The surveillance camera 1 outputs video signals of taken images to the MPEG video encoder 2.

The MPEG video encoder 2 codes the video signals according to the MPEG and outputs coded data to the video recording apparatus 3. The MPEG video encoder 2 also outputs zero difference sum-totals, minimum difference sum-totals, and motion vectors calculated during the coding to the motion detecting apparatus 4. The terms mentioned here are explained later with the construction-of the MPEG video encoder 2.

The video recording apparatus 3 stores the coded data outputted from the MPEG video encoder 2 in a storage medium, as well as decoding the data according to the MPEG and displaying obtained images on a display or the like.

The surveillance camera 1, the MPEG video encoder 2, and the video recording apparatus 3 do not include new construction elements and so can be realized by conventional apparatuses.

The motion detecting apparatus 4 detects motion of objects in the images taken by the surveillance camera 1, using the zero difference sum-totals, minimum difference sum-totals, and motion vectors outputted from the MPEG video encoder 2.

Figure 2:
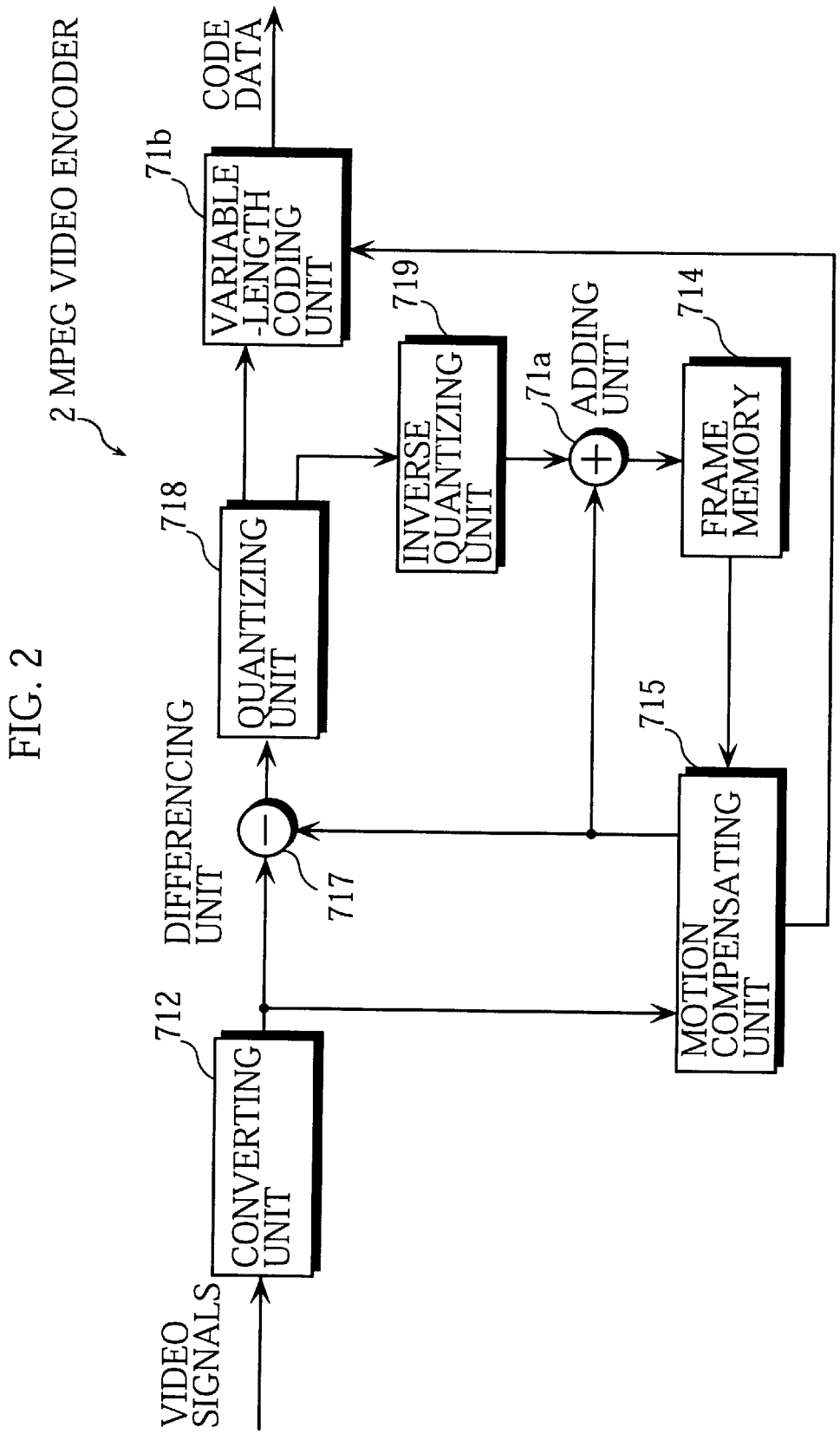
FIG. 2 is a block diagram showing the construction of a MPEG video encoder 2 shown in FIG. 1.

FIG. 2 is a block diagram showing the construction of the MPEG video encoder 2.

In the figure, the MPEG video encoder 2 includes a converting unit 712, a motion compensating unit 715, a differencing unit 717, a quantizing unit 718, a variable-length coding unit 71$b$, an inverse quantizing unit 719, an adding unit 71$a$, and a frame memory 714.

The converting unit 712 receives the video signals from the surveillance camera 1. The video signals include luminance information and color difference information and constitute a plurality of consecutive frames. The converting unit 712 converts the luminance information and the color difference information to luminance signals and color difference signals in resolutions used for coding. Here, luminance signals of one frame have a 720- by 480-pixel resolution, while color difference signals of one frame have a 360- by 240-pixel resolution.

The converting unit 712 then divides each of the plurality of frames into macro blocks that each have 16×16 pixels, and outputs luminance signals and color difference signals of each macro block to the differencing unit 717 as a target block (i.e. a macro block which is to be coded). A macro block referred to here is composed of a luminance block made up of 16×16 luminance signals, a blue difference block made up of 8×8 blue difference signals, and a red difference block made up of 8×8 red difference signals. The above three blocks spatially correspond to each other.

The converting unit 712 also outputs the luminance block to the motion compensating unit 715.

In the following explanation, a macro block, a luminance block, a blue difference block, and a red difference block are respectively expressed as MB, YB, CbB, and CrB, with subscripts which represent a spatial position (xy coordinates) of the block on a frame and a temporal position of the frame that contains the block being attached to each of the legends to specify a block (e.g. MB$i,j,n$ denoting a macro block present in a position (i,j) on a frame n).

Motion compensating prediction is a method to find, for a pixel X$i,j,n$ in a frame n, a pixel X$s,t,m$ that is closely analogous to X$i,j,n$ from a frame m which is close to the frame n. The detected pixel X$s,t,m$ is then used for coding X$i,j,n$.

The motion compensating unit 715 performs this motion compensating prediction in units of luminance blocks. Once a luminance block YB$i,j,n$ of the frame n has been outputted from the converting unit 712, the motion compensating unit 715 searches another frame m for a block YB$s,t,m$ of 16×16 pixels that is closely analogous to YB$i,j,n$.

The luminance block YB$i,j,n$ is a luminance block of the target block which is to be coded. The block YB$s,t,m$ is a block used as a reference when the target block is coded. The search for YB$s,t,m$ is conducted in a 0.5-pixel unit and thus its position may not necessarily match a spatial position of a luminance block of a macro block on the frame m.

The frame m is a past or future frame, stored in the frame memory 714 after being decoded by the inverse quantizing unit 719 and the adding unit 71$a$, that is relatively close to the frame n. The frame n and the frame m are respectively called the target frame and the reference frame.

To find the block YB$s,t,m$ that has the closest correlation with the luminance block YB$i,j,n$, the motion compensating unit 715 calculates a sum-total of absolute luminance differences for corresponding pixels between the luminance block YB$i,j,n$ and each block (16×16 pixels) in a search area (+/− several tens of pixels in the horizontal and vertical directions) of the frame m.

Next, the motion compensating unit 715 sets a block whose difference sum-total is the smallest among the calculated difference sum-totals, as YB$s,t,m$. This difference sum-total is called a minimum difference sum-total of YB$i,j,n$ and expressed as AE$i,j,n$ in this specification. In a like manner, a difference sum-total of the luminance block YB$i,j,n$ and a block YB$i,j,m$ which corresponds to the same spatial position as YB$i,j,n$ on the frame m is called a zero difference sum-total and expressed as AE0$i,j,n$.

The motion compensating unit 715 further calculates a motion vector MV$i,j,n$ from the luminance block YB$i,j,n$ and the block YB$s,t,m$. This motion vector shows the spatial correlation between YB$i,j,n$ and YB$s,t,m$, and is expressed by a horizontal component MVx$i,j,n$=s−i and a vertical component MVy$i,j,n$=t−j.

The motion compensating unit 715 then extracts a blue difference block CbB$s,t,m$ and a red difference block CrB$s,t,m$ which spatially correspond to the block YB$s,t,m$ from the frame m in the frame memory 714, CbB$s,t,m$ and CrB$s,t,m$ being later used as references for a blue difference block CbB$i,j,n$ and a red difference block CrB$i,j,n$ of the target block. The motion compensating unit 715 outputs YB$s,t,m$, CbB$s,t,m$, and CrB$s,t,m$ to the differencing unit 717 together as a reference block for the target block. The motion compensating unit 715 also outputs the motion vector MV$i,j,n$ to the variable-length coding unit 71$b$.

The motion compensating unit 715 further outputs the minimum difference sum-total AE$i,j,n$ and zero difference sum-total AE0$i,j,n$ obtained during the above motion compensating prediction to the motion detecting apparatus 4 along with the motion vector MV$i,j,n$.

The differencing unit 717 receives the target block and the reference block respectively from the converting unit 712 and the motion compensating unit 715, calculates a prediction error from the target block and the reference block, and outputs the prediction error to the quantizing unit 718. The prediction error is expressed by differences between the two blocks.

The quantizing unit 718 receives the prediction error from the differencing unit 717 and DCT-codes the prediction error in units of 8×8 pixels. The quantizing unit 718 then quantizes the resulting DCT-coded coefficients and outputs quantized data.

The variable-length coding unit 71b performs variable-length coding on the quantized data outputted from the quantizing unit 718 and on the motion vector received from the motion compensating unit 715, and outputs the resulting coded data.

The inverse quantizing unit 719 and the adding unit 71a perform inverse quantization and DCT decoding on the quantized data outputted from the quantizing unit 718 to recover the prediction error, add the prediction error to the reference block in order to reproduce the target frame being coded, and output the target frame to the frame memory 714.

The frame memory 714 has two memory areas for storing two frames. In one memory area the reproduced target frame is inputted in units of blocks via the adding unit 71a. In the other memory area a frame reproduced immediately preceding the target frame is inputted. This immediately preceding frame is used as the reference frame by the motion compensating unit 715.

Figure 3:
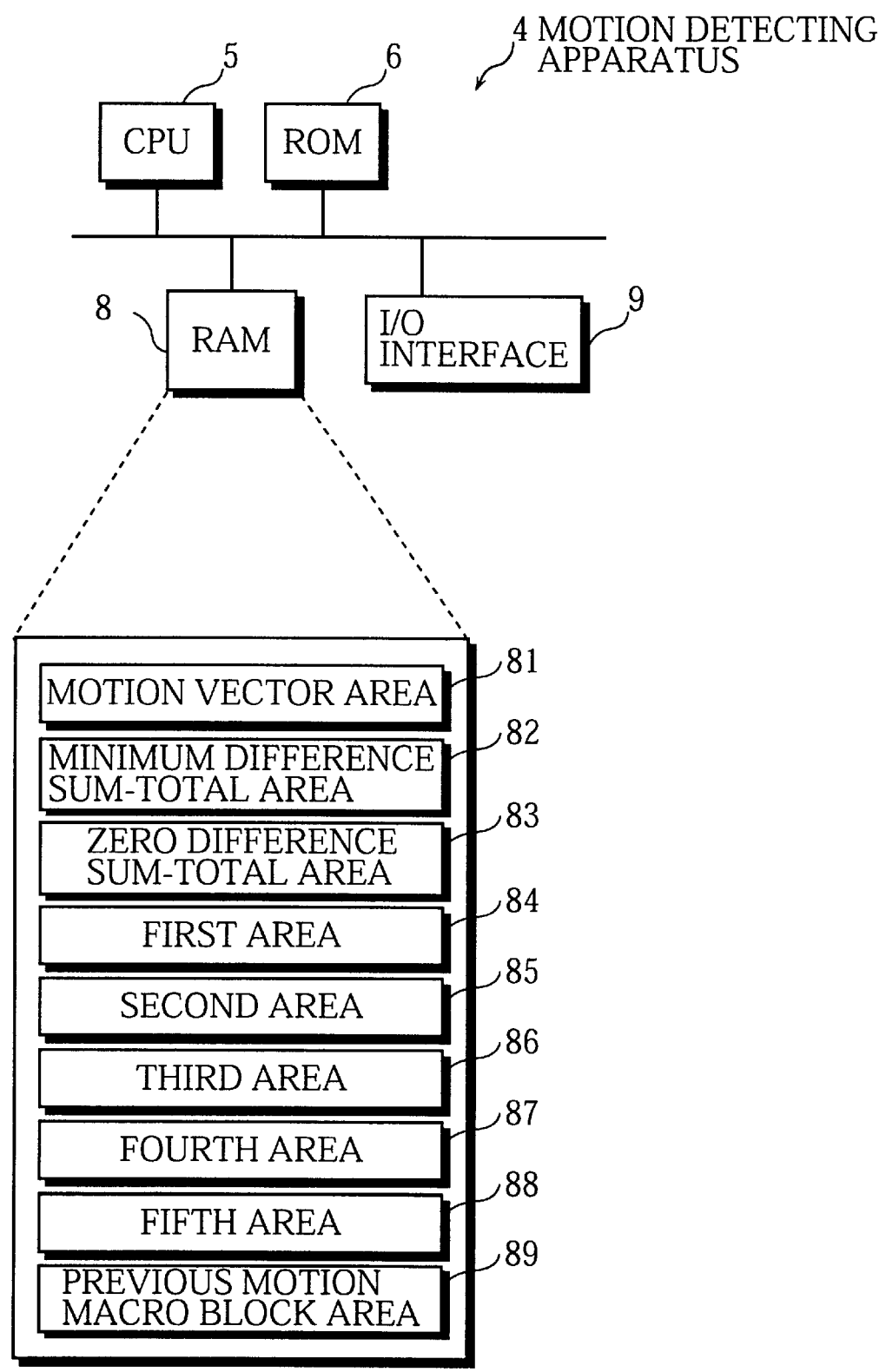
FIG. 3 is a block diagram showing the construction of the motion detecting apparatus 4 of the first embodiment of the present invention shown in FIG. 1.

FIG. 3 is a block diagram showing the construction of the motion detecting apparatus 4.

In the figure, the motion detecting apparatus 4 is roughly made up of a CPU 5, a ROM 6, a RAM 8, and an I/O (input-output) interface 9. The ROM 6 stores a program describing the motion detection processing. The CPU 5 executes this motion detecting program to detect motion of objects in the images taken by the surveillance camera 1.

Figure 4:
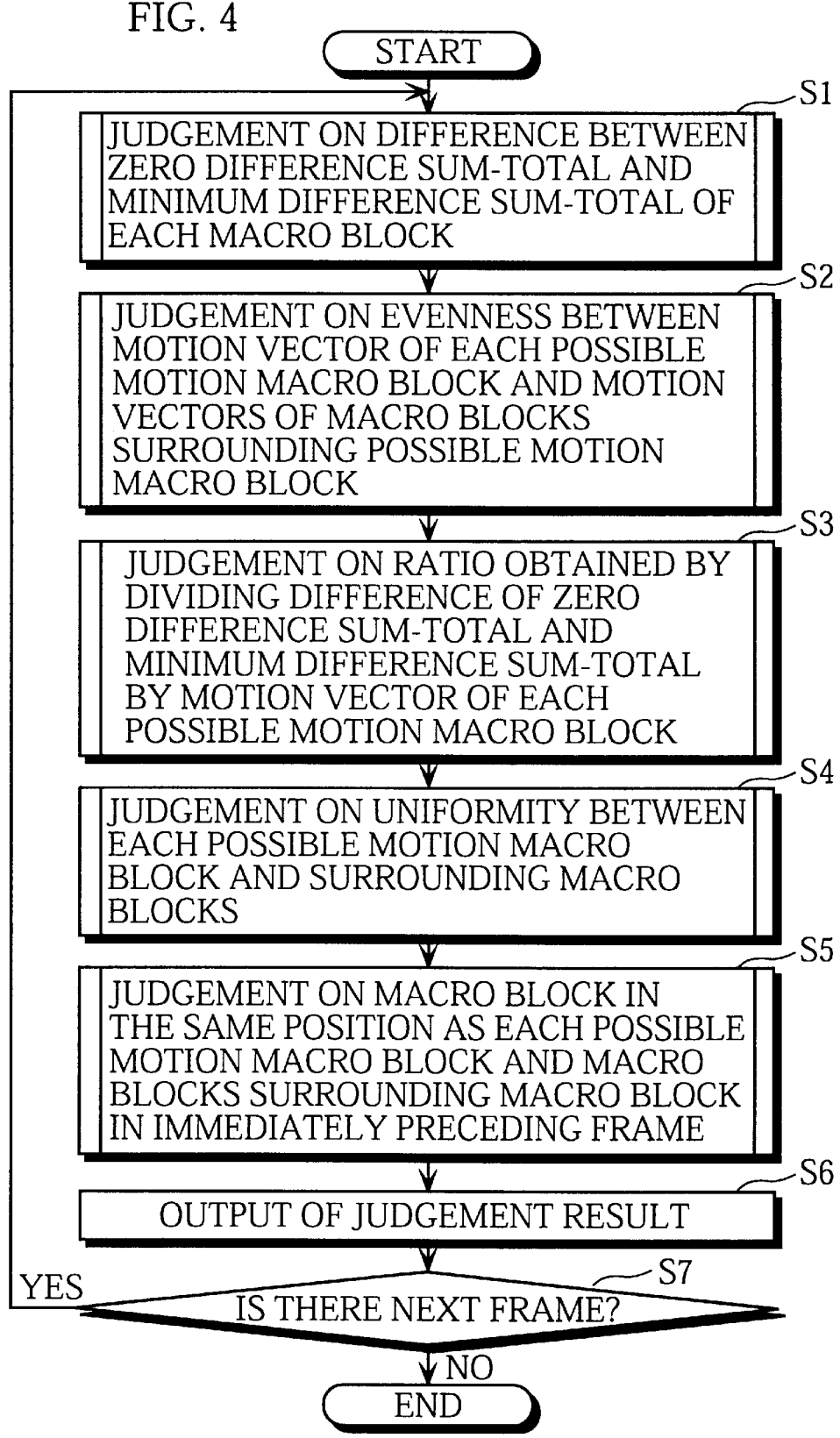
FIG. 4 is a flowchart showing the overall motion detection processing.

FIG. 4 is a flowchart showing the overall motion detection processing.

In the figure, the motion detection processing includes five judgement steps S1~S5 for sorting macro blocks of each frame into motion macro blocks and static macro blocks. A motion macro block denotes a macro block in an image area that shows an object in motion, while a static macro block denotes a macro block in an image area that does not show an object in motion. The motion detecting apparatus 4 performs this processing for each frame as follows.

In step S1, the motion detecting apparatus 4 judges for each macro block in a present frame whether a difference between a zero difference sum-total AE0 and a minimum difference sum-total AE of the macro block is larger than a threshold value. As a result, macro blocks that meet this condition are set as possible motion macro blocks, while macro blocks that do not meet this condition are set as static macro blocks.

In step S2, the motion detecting apparatus 4 judges for each possible motion macro block found in step S1 whether a motion vector of the possible motion macro block has a direction and magnitude roughly similar to motion vectors of macro blocks surrounding the possible motion macro block. As a result, possible motion macro blocks that meet this condition remain as possible motion macro blocks, while possible motion macro blocks that do not meet the condition are set as static macro blocks.

In step S3, the motion detecting apparatus 4 judges for each possible motion macro block found in step S2 whether a ratio, obtained when dividing a difference between AE0 and AE of the possible motion macro block by a motion vector of the possible motion macro block, is no less than a threshold value. As a result, possible motion macro blocks that meet this condition remain as possible motion macro blocks, while possible motion macro blocks that do not meet the condition are set as static macro blocks.

In step S4, the motion detecting apparatus 4 judges for each possible motion macro block obtained in step S3 whether at least one of macro blocks surrounding the possible motion macro block is a possible motion macro block, and if not, whether a magnitude of a motion vector of the possible motion macro block is small. As a result, possible motion macro blocks that meet one of the two conditions remain as possible motion macro blocks, while possible motion macro blocks that do not meet any of the two conditions are set as static macro blocks.

In step S5, the motion detecting apparatus 4 judges for each possible motion macro block obtained in step S4 whether in a frame immediately preceding the present frame, any one of a macro block present in the same position as the possible motion macro block and macro blocks surrounding the macro block is a motion macro block. Possible, motion macro blocks that meet this condition are set as motion macro blocks, while possible motion macro blocks that do not meet the condition are set as static macro blocks.

In step S6, the judgement result obtained for the present frame as a result of steps S1~S5 is outputted.

In step S7, the motion detecting apparatus 4 repeats the above processing for the next frame.

The RAM 8 is used in the above motion detection processing and is mainly composed of a motion vector area 81, a minimum difference sum-total area 82, a zero difference sum-total area 83, first to fifth areas 84~88, and a previous motion macro block area 89.

The motion vector area 81, the minimum difference sum-total area 82, and the zero difference sum-total area 83 respectively store a motion vector MV, a minimum difference sum-total AE, and a zero difference sum-total AE0 outputted from the MPEG video encoder 2 for each macro block MB of the present frame.

The first to fifth areas 84~88 respectively store judgement results obtained in steps S1~S5. Specifically, a set of flags each showing whether a macro block is a possible motion macro block or a static macro block is stored in each of the first to fourth areas 84~87 respectively as flags FI~FIV, where flags show 1 for possible motion macro blocks and 0 for static macro blocks. The fifth area 88 similarly stores a set of flags FV that each show 1 for a motion macro block and 0 for a static macro block.

The previous motion macro block area 89 stores a set of flags FIV of a frame immediately preceding the present frame.

A more detailed description of each of steps S1~S5 is given below.

<Step S1>

Figure 5:
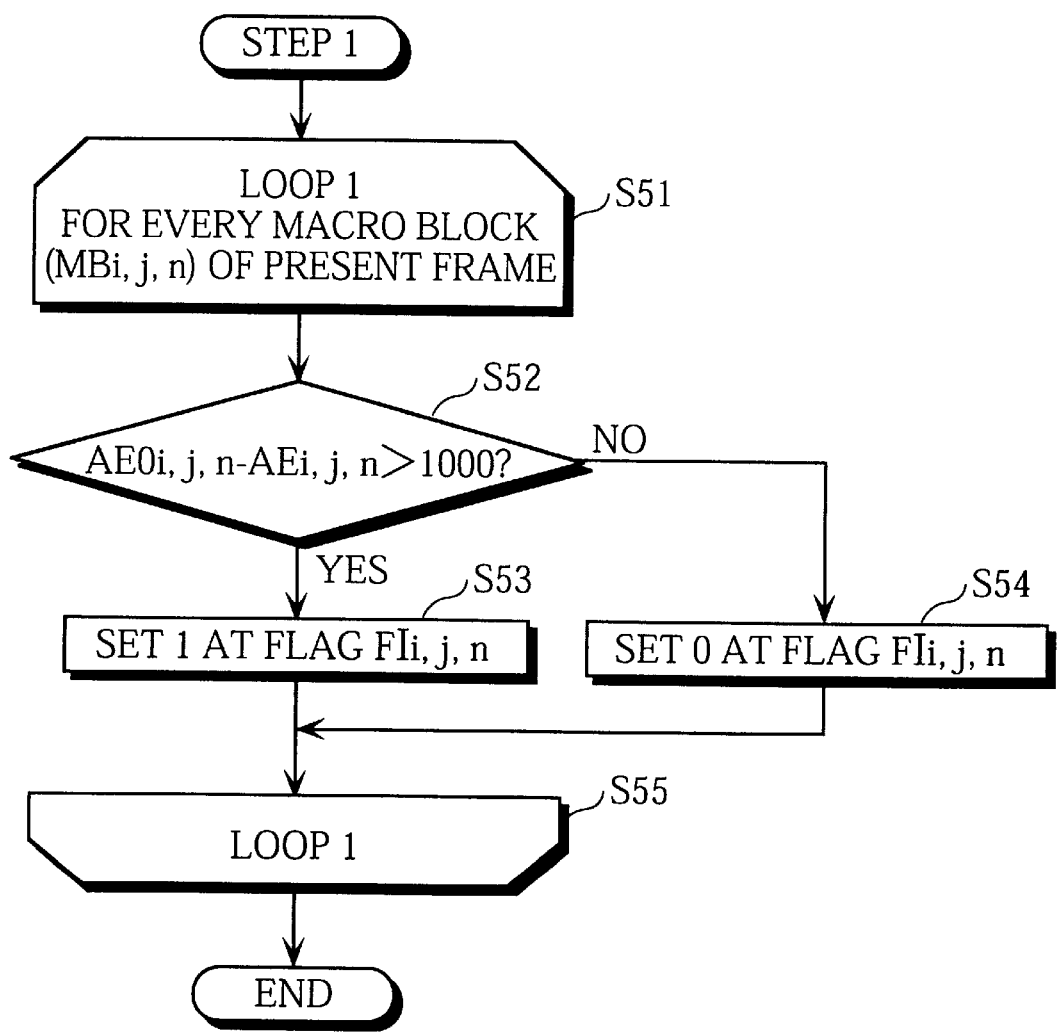
FIG. 5 is a flowchart showing the processing of step S1 shown in FIG. 4.

FIG. 5 is a flowchart showing the processing of step S1 shown in FIG. 4.

The motion detecting apparatus 4 performs this processing for each macro block of the present frame (S51). The following explanation uses a macro block MBi,j,n as an example of a present macro block.

First, the motion detecting apparatus 4 calculates a difference between a zero difference sum-total AE0i,j,n and a minimum difference sum-total AEi,j,n of MBi,j,n and compares the difference with a threshold value (e.g. 1000) (S52).

If the difference is larger than the threshold value, the motion detecting apparatus 4 judges MBi,j,n as a possible motion macro block and sets FIi,j,n to 1. On the other hand, if the difference is no larger than the threshold value, the motion detecting apparatus 4 judges MBi,j,n as a static macro block and sets FIi,j,n to 0 (S53 and S54).

The motion detecting apparatus 4 repeats the above procedure for a macro block following MBi,j,n.

With this procedure, the motion detecting apparatus 4 avoids the mistake of detecting a flat area as motion in the presence of flicker with small luminance differences.

Assume an image is classified under an image area that shows an object in motion (motion area) and an image area that does not show an object in motion, the latter further being classified under an image area that shows a flat part (flat area) and an image area that shows a nonflat part (nonflat area). In the presence of small flicker, a difference between a zero difference sum-total and a minimum difference sum-total of a macro block is small in the flat area or the nonflat area, whereas such a difference is large in the motion area. This property is used in step S1 to judge whether the present macro block is a possible motion macro block.

<Step S2>

Figure 6A:
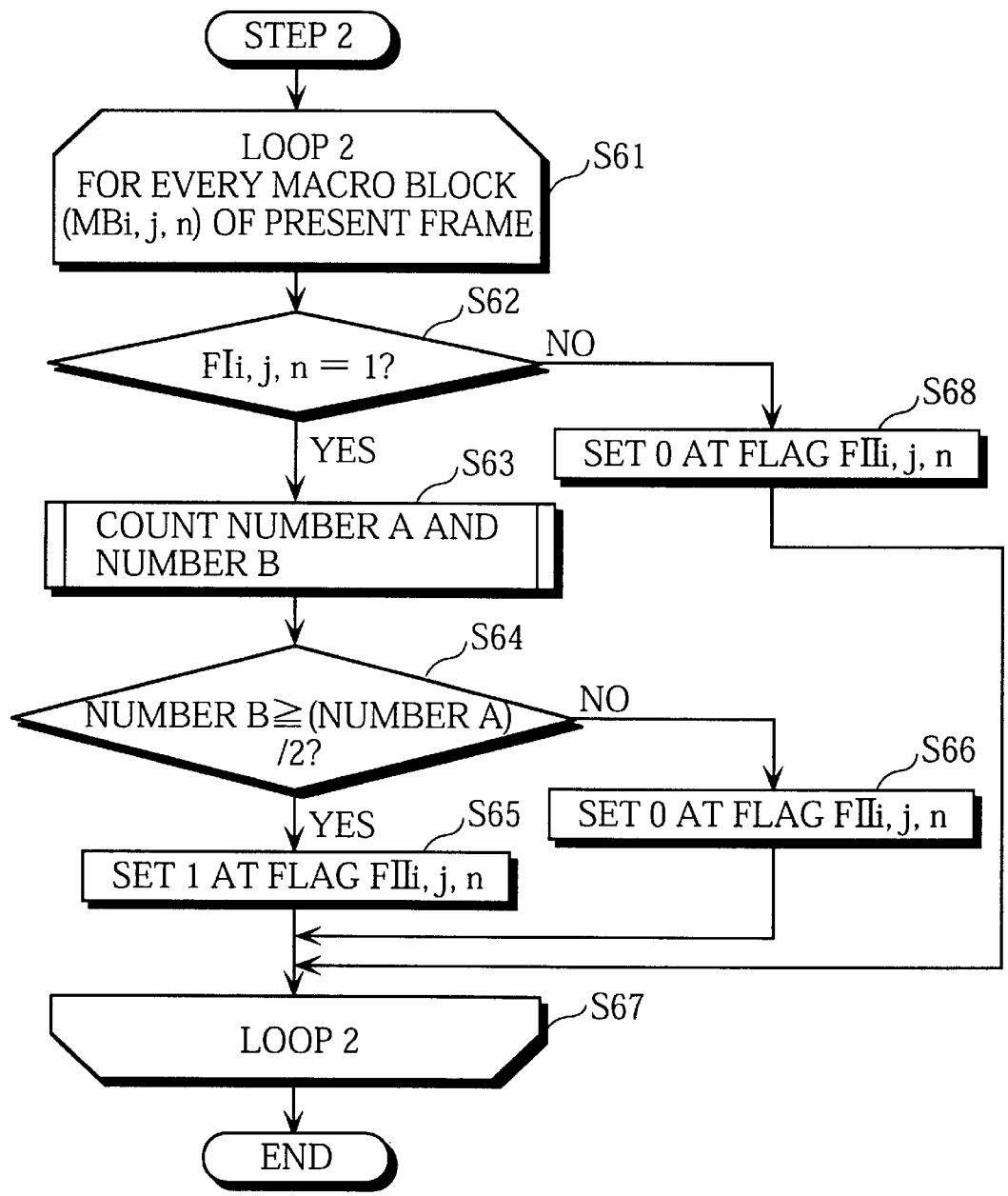
FIG. 6A is a flowchart showing the processing of step S2 shown in FIG. 4.

FIG. 6A is a flowchart showing the processing of step S2 shown in FIG. 4.

The motion detecting apparatus 4 performs this processing for each macro block of the present frame (S61). Here, the macro block MBi,j,n is used as an example of a present macro block.

The motion detecting apparatus 4 reads FIi,j,n from the first area 84 to check whether FIi,j,n=1 (S62).

If FIi,j,n=0, the motion detecting apparatus 4 sets FIIi,j,n to 0 (S68).

If FIi,j,n=1, the motion detecting apparatus 4 counts the number A of possible motion macro blocks among macro blocks surrounding MBi,j,n. The motion detecting apparatus 4 then counts, among the counted possible motion macro blocks, the number B of possible motion macro blocks whose motion vectors have magnitudes and directions similar to a motion vector MVi,j,n of MBi,j,n (S63).

Figure 6B:
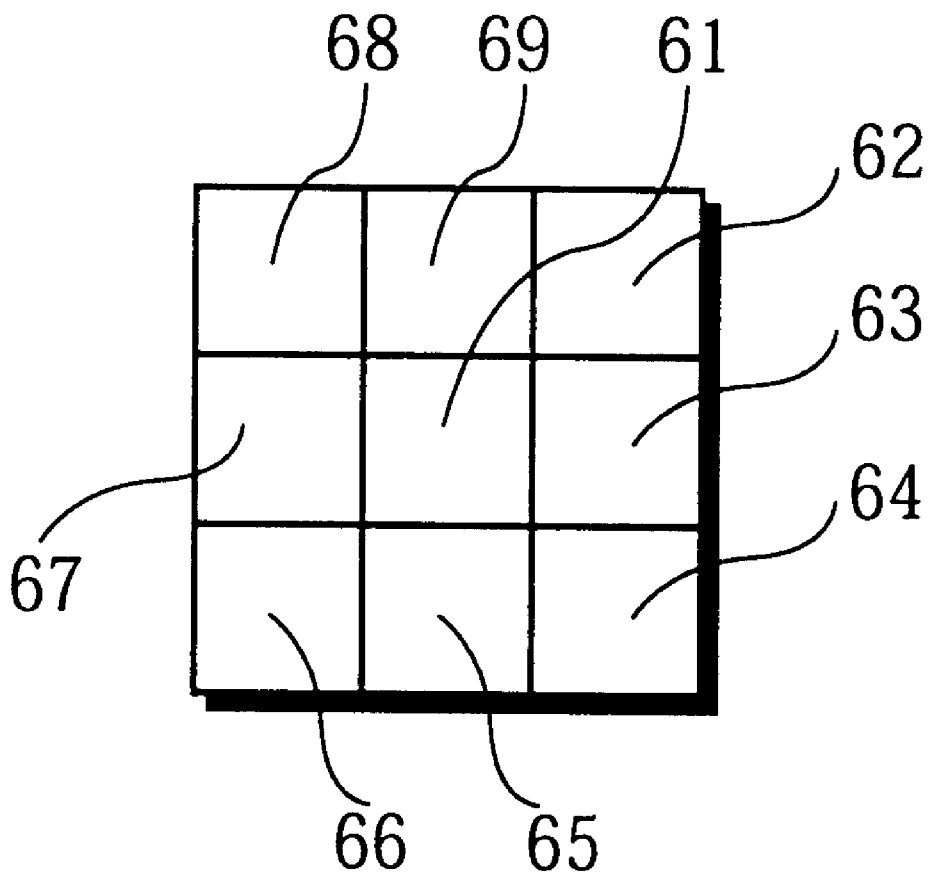
FIG. 6B shows the alignment of a present macro block and macro blocks surrounding the present macro block.

FIG. 6B shows the alignment of one macro block and 8 macro blocks surrounding the macro block. In the figure, if macro block 61 is the present macro block, then macro blocks 62~69 are the surrounding macro blocks.

The motion detecting apparatus 4 judges whether the number B accounts for no less than one-half the number A (S64).

If the number B is no less than one-half the number A, the motion detecting apparatus 4 judges MBi,j,n as a possible motion macro block and sets FIIi,j,n to 1 (S65). Otherwise, the motion detecting apparatus 4 judges MBi,j,n as a static macro block and sets FIIi,j,n to 0 (S66).

The motion detecting apparatus, 4 repeats this procedure for a macro block following MBi,j,n (S67).

Figure 7:
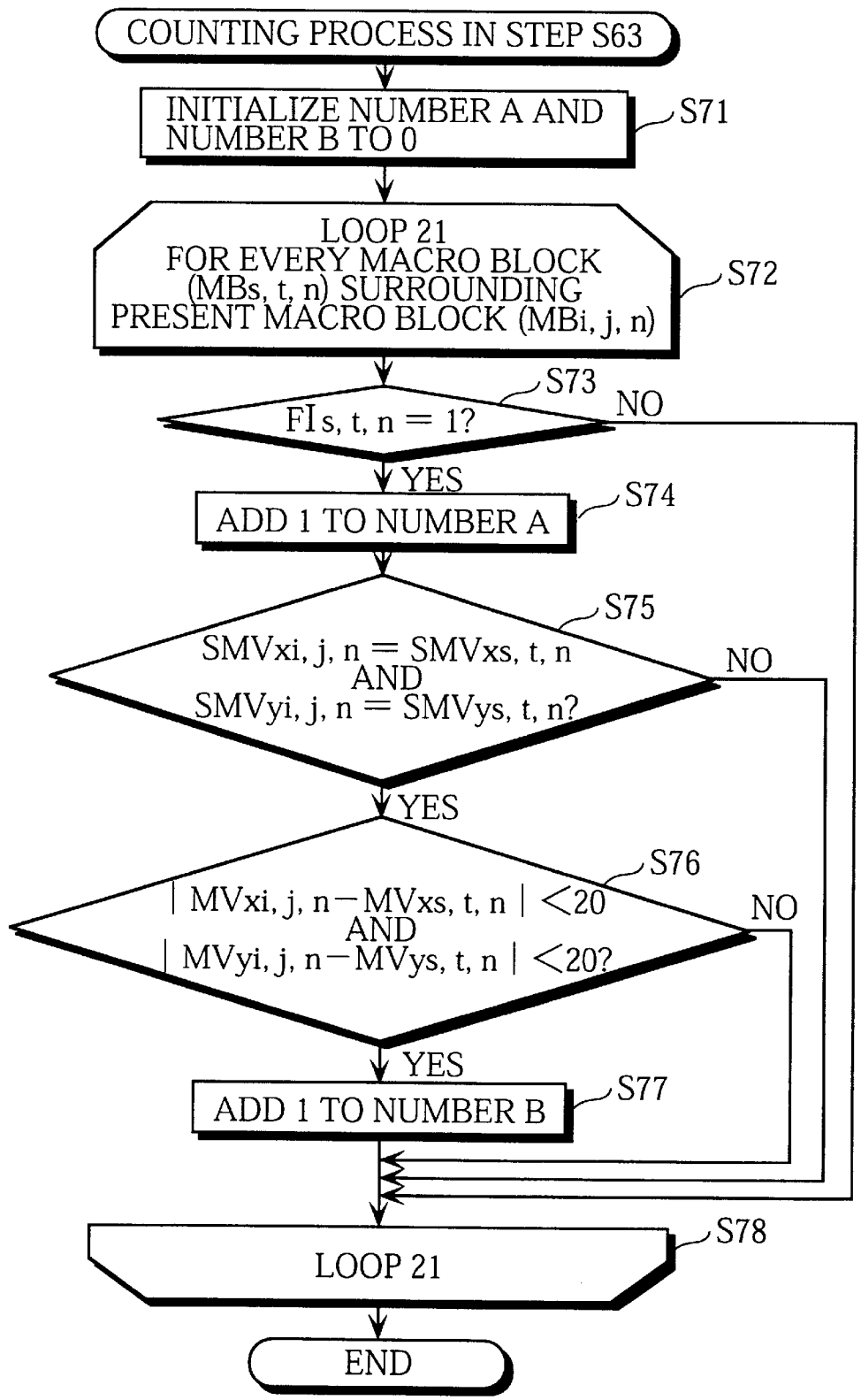
FIG. 7 is a flowchart showing the process of counting the numbers A and B in step S63 in detail.

FIG. 7 is a flowchart showing the counting process in step S63 in more details.

First, the motion detecting apparatus 4 initializes the number A and the number B to 0 (S71).

The motion detecting apparatus 4 then performs the following process for each of the 8 macro blocks surrounding MBi,j,n (S72).

Suppose MBs,t,n is one of the 8 macro blocks surrounding MBi,j,n.

The motion detecting apparatus 4 reads FIs,t,n from the first area 84 and checks whether FIs,t,n=1 (S73). If FIs,t,n=1, the motion detecting apparatus 4 adds 1 to the number A (S74).

The motion detecting apparatus 4 then reads signs SMVxs,t,n and SMVys,t,n of MVxs,t,n and MVys,t,n of the motion vector MVs,t,n and signs SMVxi,j,n and SMVyi,j,n of MVxi,j,n and MVyi,j,n of the motion vector MVi,j,n from the motion vector area 81 and compares SMVxs,t,n and SMVys,t,n respectively with SMVxi,j,n and SMVyi,j,n to judge whether the direction of MVs,t,n of the surrounding macro block MBs,t,n is roughly similar to the direction of MVi,j,n of the present macro block MBi,j,n (S75).

If SMVxs,t,n and SMVys,t,n respectively match SMVxi,j,n and SMVyi,j,n, the motion detecting apparatus 4 further compares the magnitude of MVs,t,n with the magnitude of MVi,j,n (S76).

More specifically, the motion detecting apparatus 4 judges whether an absolute difference between MVxs,t,n and MVxi,j,n and an absolute difference between MVys,t,n and MVyi,j,n are both smaller than a threshold value (e.g. 20).

When MBs,t,n meets both of the conditions in steps S75 and S76, the motion detecting apparatus 4 adds 1 to the number B (S77).

By repeating steps S72~S77 for the other macro blocks surrounding MBi,j,n (S78), the motion detecting apparatus 4 counts the number A and the number B.

With the above procedure of step S2, it is possible to avoid incorrect detection of a macro block in a flat area where luminance greatly changes in a short time because of light flash or the like.

Under circumstances where luminance greatly changes within a short time, magnitudes and directions of motion vectors are uniform in a motion area, magnitudes and directions of motion vectors are random in a flat area, and magnitudes of motion vectors are 0 in a nonflat area. This property is used in step S2 where the present macro block is judged as a static macro block when motion vectors of the present macro block and its surrounding macro blocks are random in direction and magnitude, while the present macro block is judged as a possible motion macro block when motion vectors of the present macro block and its surrounding macro blocks are even indirection and magnitude. Since a difference between a zero difference sum-total and minimum difference sum-total of a macro block in a nonflat area is approximately 0, such a macro block has been already judged as a static macro block in step S1.

<Step S3>

Figure 8:
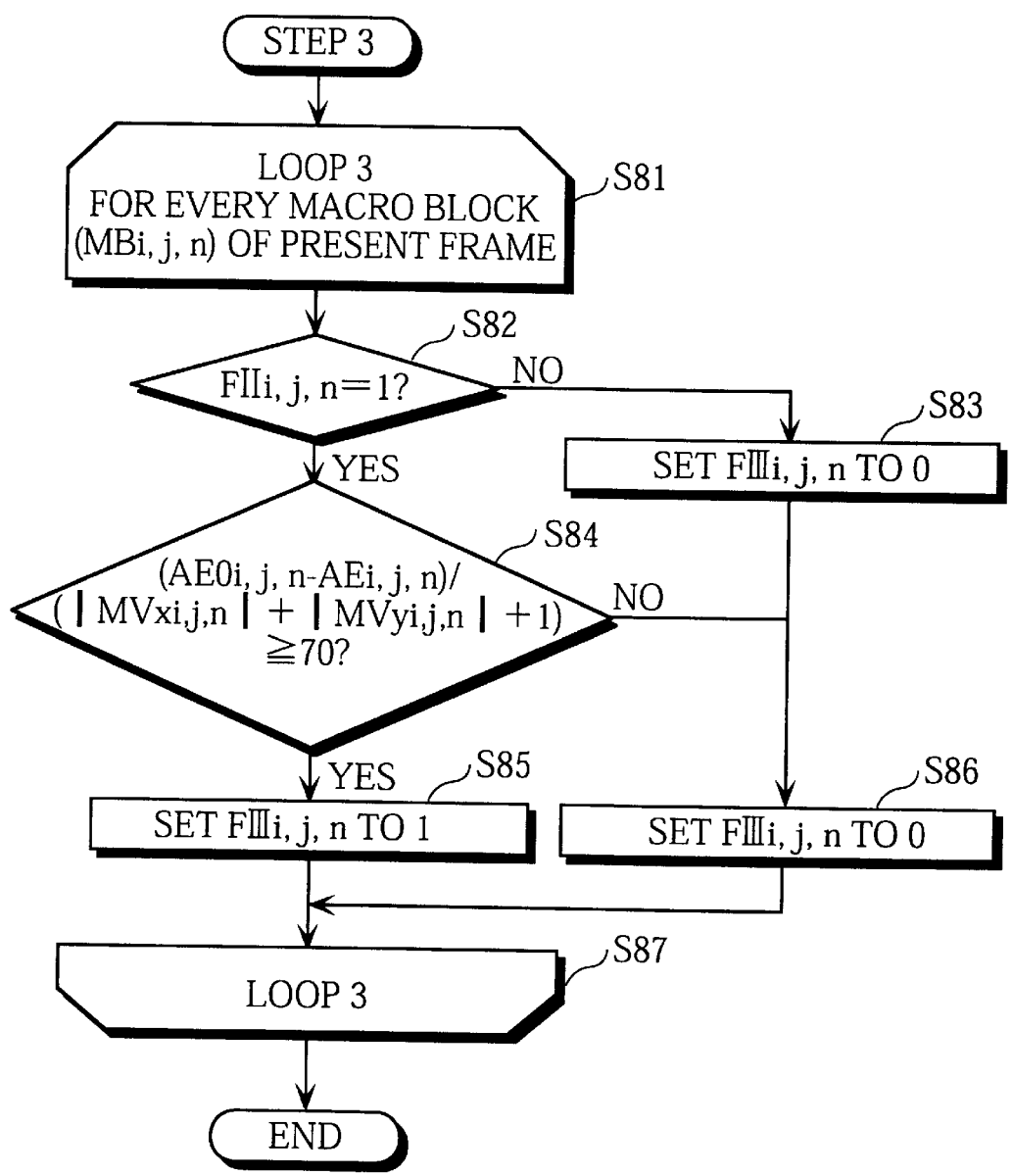
FIG. 8 is a flowchart showing the processing of step S3 shown in FIG. 4.

FIG. 8 is a flowchart showing the processing of step S3 shown in FIG. 4.

The motion detecting apparatus 4 performs this processing for every macro block of the present frame (S81). Here, the macro block MBi,j,n is used as an example of a present macro block.

The motion detecting apparatus 4 reads FIIi,j,n from the second area 85 and checks whether FIIi,j,n=1 (S82).

If FIIi,j,n=0, the motion detecting apparatus 4 sets FIIIi,j,n to 0 (S83).

If FIIi,j,n=1, the motion detecting apparatus 4 first subtracts AEi,j,n from AE0i,j,n. This calculation may be omitted by storing the difference calculated in step S52 in advance and using the stored difference. The motion detecting apparatus 4 then adds |MVxi,j,n|, |MVyi,j,n|, and 1 together. The reason for adding 1 here is to avoid the addition result which is to be used as a divisor from becoming 0 in the case where |MVxi,j,n| and |MVyi,j,n| are both 0.

The motion detecting apparatus 4 divides the above difference by the addition result to find the quotient and compares the quotient with a threshold value (e.g. 70) (S84). If the quotient is no less than the threshold value, the motion detecting apparatus 4 judges MBi,j,n as a possible motion macro block and sets FIIIi,j,n to 1 (S85). Otherwise, the motion detecting apparatus 4 judges MBi,j,n as a static macro block and sets FIIIi,j,n to 0 (S86).

The above steps S82~S86 are repeated for all macro blocks of the present frame (S87).

With this procedure, incorrect detection of a macro block in a flat area where luminance greatly changes in a short time can be avoided as in the case of step S2.

Since the above quotient is smaller than the threshold value in a flat area, the motion detecting apparatus 4 judges the present macro block as a possible motion macro block only when the quotient is no less than the threshold value.
<Step S4>

Figure 9:
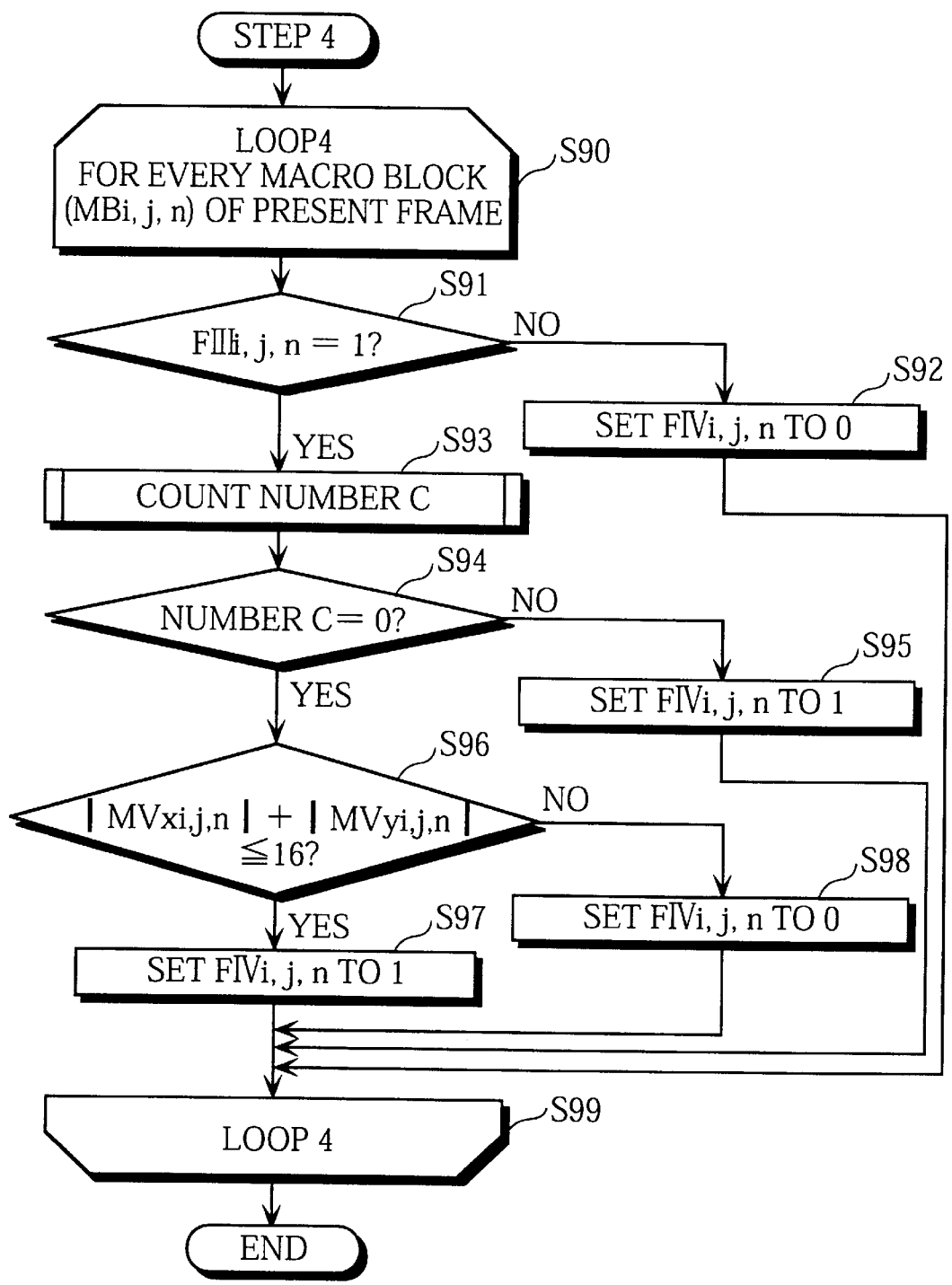
FIG. 9 is a flowchart showing the processing of step S4 shown in FIG. 4.

FIG. 9 is a flowchart showing the processing of step S4 in FIG. 4.

The motion detecting apparatus 4 performs this processing for every macro block of the present frame (S90). Here, the macro block MBi,j,n is used as an example again.

The motion detecting apparatus 4 reads FIIIi,j,n from the third area 86 and checks whether FIIIi,j,n=1 (S91).

If FIIIi,j,n=0, the motion detecting apparatus 4 sets FIVi,j,n to 0 (S92).

If FIIIi,j,n=1, the motion detecting apparatus 4 counts a number C of possible motion macro blocks among macro blocks surrounding MBi,j,n (S93).

When the counted number C is not 0 (i.e. C≧1) (S94), the motion detecting apparatus 4 judges MBi,j,n as a possible motion macro block and set FIVi,j,n to 1 (S95).

When, on the other hand, the counted number C is 0, the motion detecting apparatus 4 judges whether a magnitude of MVi,j,n is large. If the magnitude is large, MBi,j,n is judged as a static macro block, while if the magnitude is not large, MBi,j,n is judged as a possible motion macro block. More specifically, if a sum-total of |MVxi,j,n| and |MVyi,j,n| is no larger than a threshold value (e.g. 16) (S96), the motion detecting apparatus 4 judges MBi,j,n as a possible motion macro block and sets FIVi,j,n to 1 (S97). Otherwise, the motion detecting apparatus 4 judges MBi,j,n as a static macro block and sets FIVi,j,n to 0 (S98).

The motion detecting apparatus 4 repeats steps S91~S98 for a macro block following MBi,j,n (S99).

Figure 10:
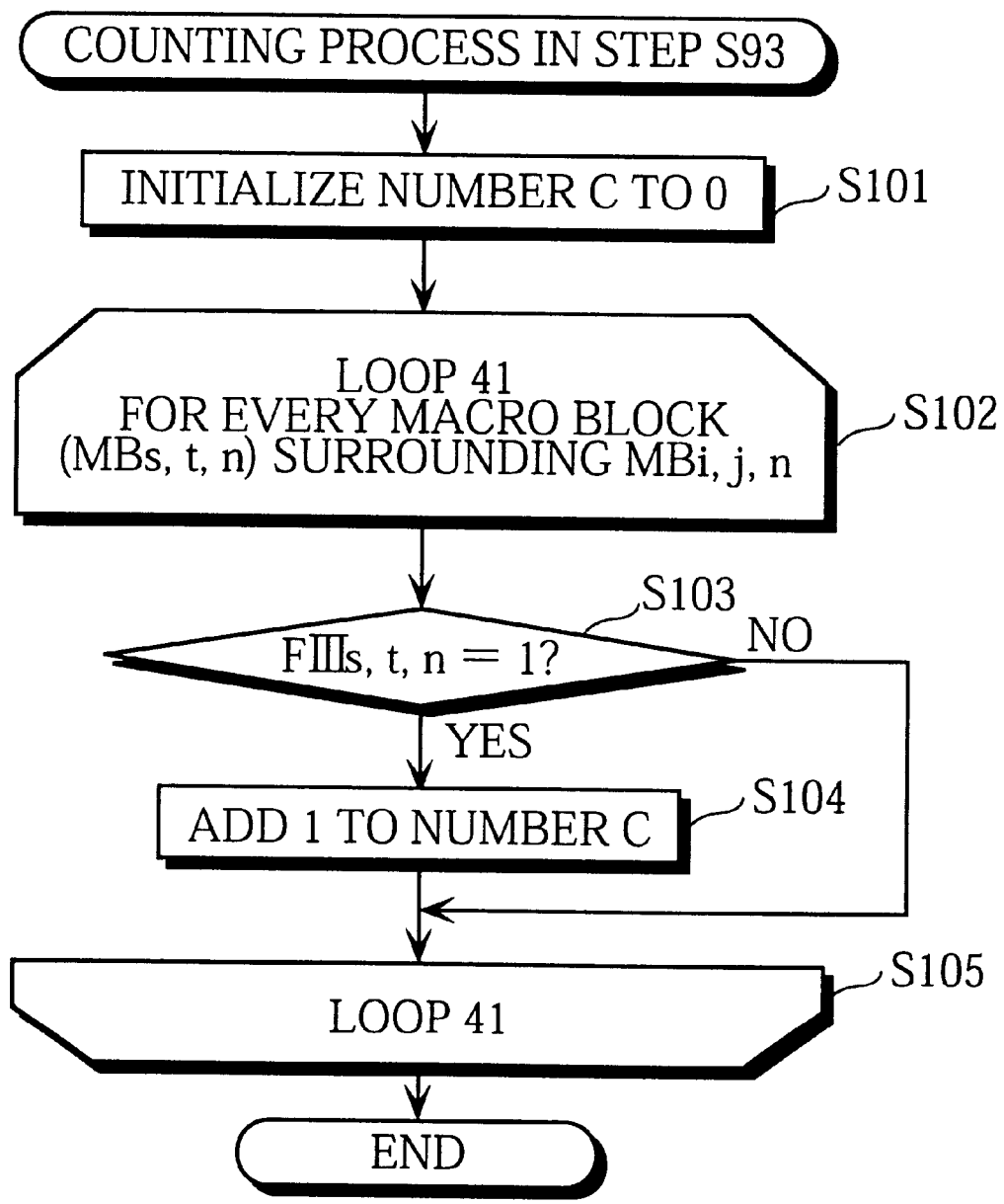
FIG. 10 is a flowchart showing the process of counting the number C in step S93 in detail.

FIG. 10 is a flowchart showing the counting process of step S93 in more details.

The motion detecting apparatus 4 first initializes the number C to 0 (S101).

The motion detecting apparatus 4 then performs the following procedure for every macro block surrounding MBi,j,n (S102). Here, MBs,t,n is used as an example of a macro block surrounding MBi,j,n.

The motion detecting, apparatus 4 reads FIIIs,t,n from the third area 86 and checks whether FIIIs,t,n=1 (S103).

If FIIIs,t,n=1, the motion detecting apparatus 4 adds 1 to the number C (S104).

By repeating the above steps S103~S104 for all of the 8 macro blocks surrounding MBi,j,n (S105), the motion detecting apparatus 4 counts the number C.

With the above procedure of step S4, the motion detecting apparatus 4 excludes a macro block which does not show an object of a substantial size such as a person from possible motion macro blocks, thereby avoiding incorrect detection. This is based on the assumption that an image area showing an object (such as a person) in motion is made up of a plurality of motion macro blocks.
<Step S5>

Figure 11:
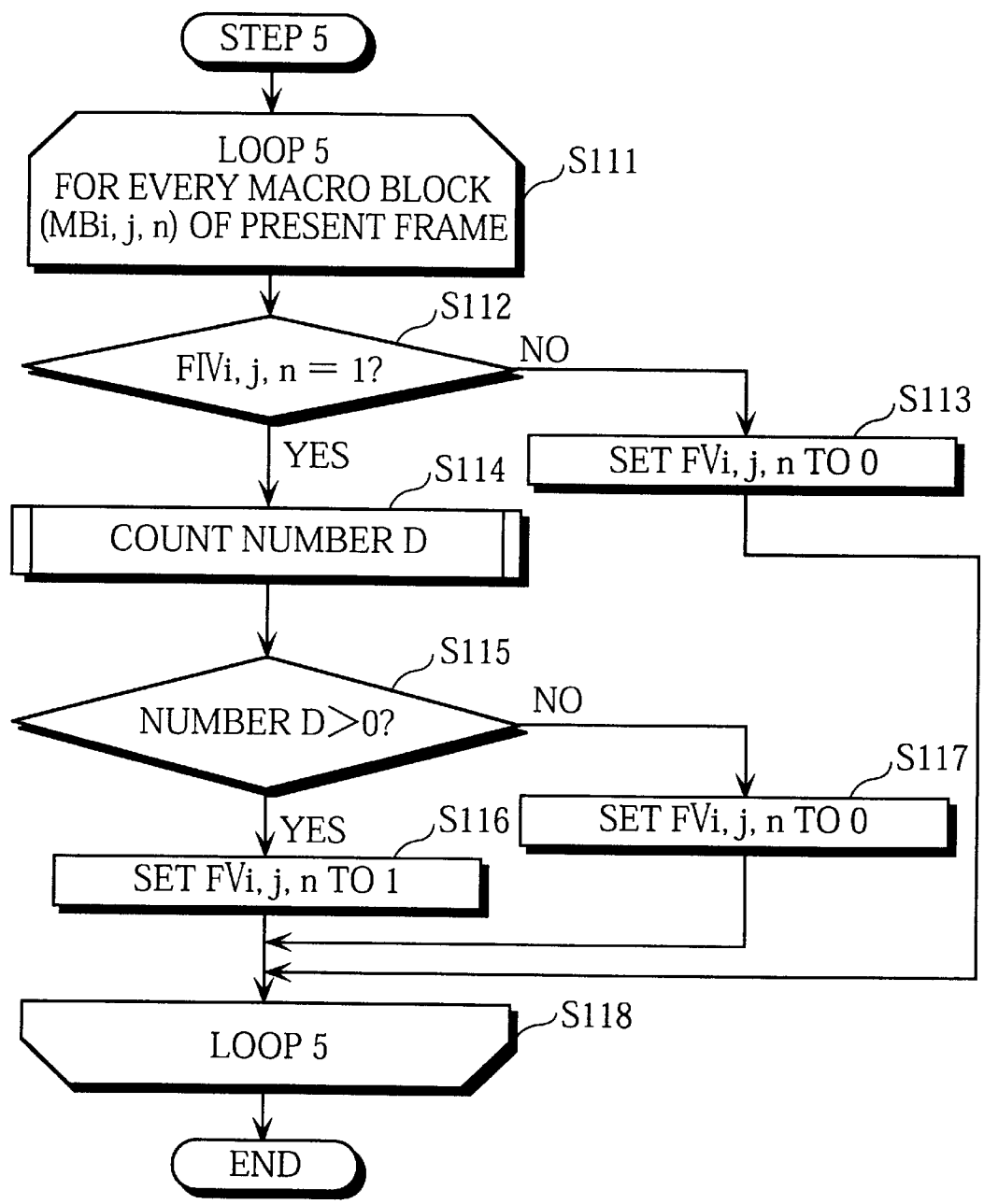
FIG. 11 is a flowchart showing the processing of step S5 shown in FIG. 4.

FIG. 11 is a flowchart showing the processing of step S5 in FIG. 4.

The motion detecting apparatus 4 performs this processing for every macro block of the present frame (S111). Here, MBi,j,n is used as an example of a present macro block.

The motion detecting apparatus 4 reads FIVi,j,n from the fourth area 87 and checks whether FIVi,j,n=1 (S112).

If FIVi,j,n=0, the motion detecting apparatus 4 sets FVi,j,n to 0 (S113)

If FIVi,j,n=1, the motion detecting apparatus 4 counts a number D of motion macro blocks among a macro block MBi,j,n−1 in the same position as MBi,j,n on a frame n−1 immediately preceding the present frame n and 8 macro blocks surrounding MBi,j,n−1 (S114).

When the counted number D is larger than 0 (S115), it indicates that one or more motion macro blocks exist in the position corresponding to MBi,j,n and its surroundings on the frame immediately preceding the present frame. Accordingly, the motion detecting apparatus 4 judges MBi,j,n as a motion macro block and sets FVi,j,n to 1 (S116) . If the number D is no larger than 0, the motion detecting apparatus 4 judges MBi,j,n as a static macro block and sets FVi,j,n to 0 (S117).

The motion detecting apparatus 4 repeats steps S112~S117 for every block of the present frame (S118).

Figure 12:
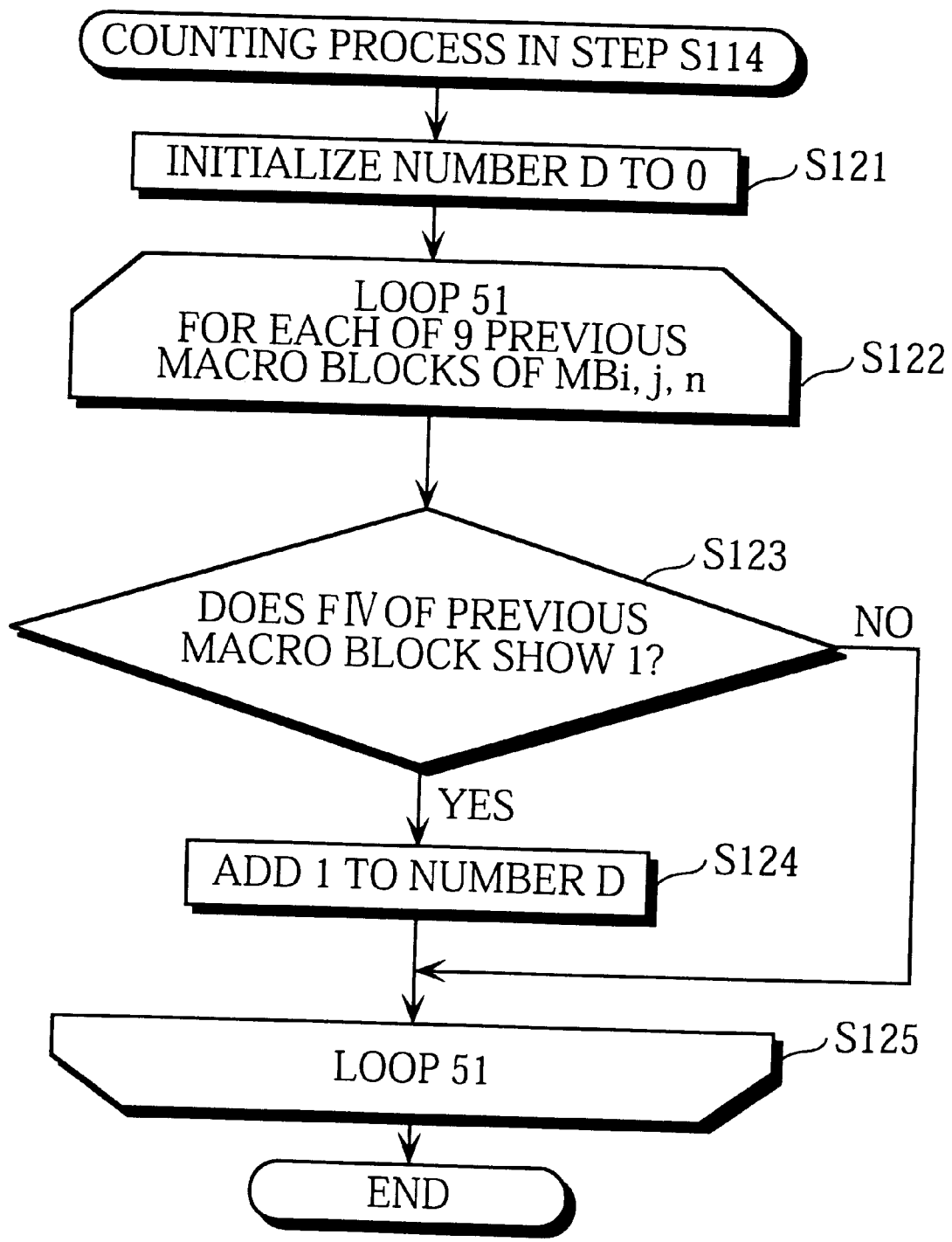
FIG. 12 is a flowchart showing the process of counting the number D in step S114 in detail.

FIG. 12 is a flowchart showing the counting process of step S114 in greater detail.

The motion detecting apparatus 4 first initializes the number D to 0 (S121).

The motion detecting apparatus 4 then performs the following procedure for each of 9 macro blocks (hereinafter called previous macro blocks) on the immediately preceding frame which are made up of MBi,j,n−1 existing in the position corresponding to MBi,j,n and 8 macro blocks surrounding MBi,j,n−1 (S122).

The motion detecting apparatus 4 reads FIV of a previous macro block from the previous motion macro block area 89 and checks whether FIV=1 (S123).

If FIV=1, the motion detecting apparatus 4 adds 1 to the number D (S124).

By repeating steps S123 and S124 for all 9 previous macro blocks of MBi,j,n (S125), the motion detecting apparatus 4 counts the number D.

With the above procedure of step S5, the motion detecting apparatus 4 excludes a macro block which does not show continuous movement of an object from motion macro blocks, thereby avoiding incorrect motion detection. This is based on the assumption that an image area showing a person or the like in motion contains or adjoins motion macro blocks over a plurality of frames.

As described above, the motion detecting apparatus 4 of the present embodiment detects motion macro blocks by performing the judgement steps S1~S5 using the minimum difference sum-totals, zero-difference sum-totals, and motion vectors outputted from the MPEG video encoder 2. In particular, with the judgement step S2 on the uniformity of magnitudes and directions of motion vectors, the motion detecting apparatus 4 does not mistakenly judge a macro block in a flat area as a motion macro block under circumstances where luminance greatly changes in a short time due to light flash or the like, so that incorrect detection can be avoided.

Second Embodiment

A motion detecting apparatus of the second embodiment of the present invention includes a RAM that prestores a critical area and a critical direction set on a frame. When one or more motion macro blocks detected as a result of the motion detection processing are present within the critical area and an average direction of motion vectors of the motion macro blocks is approximately the same as the critical direction, the motion detecting apparatus generates an alarm.

This motion detecting apparatus is explained below with reference to figures.

Figure 13:
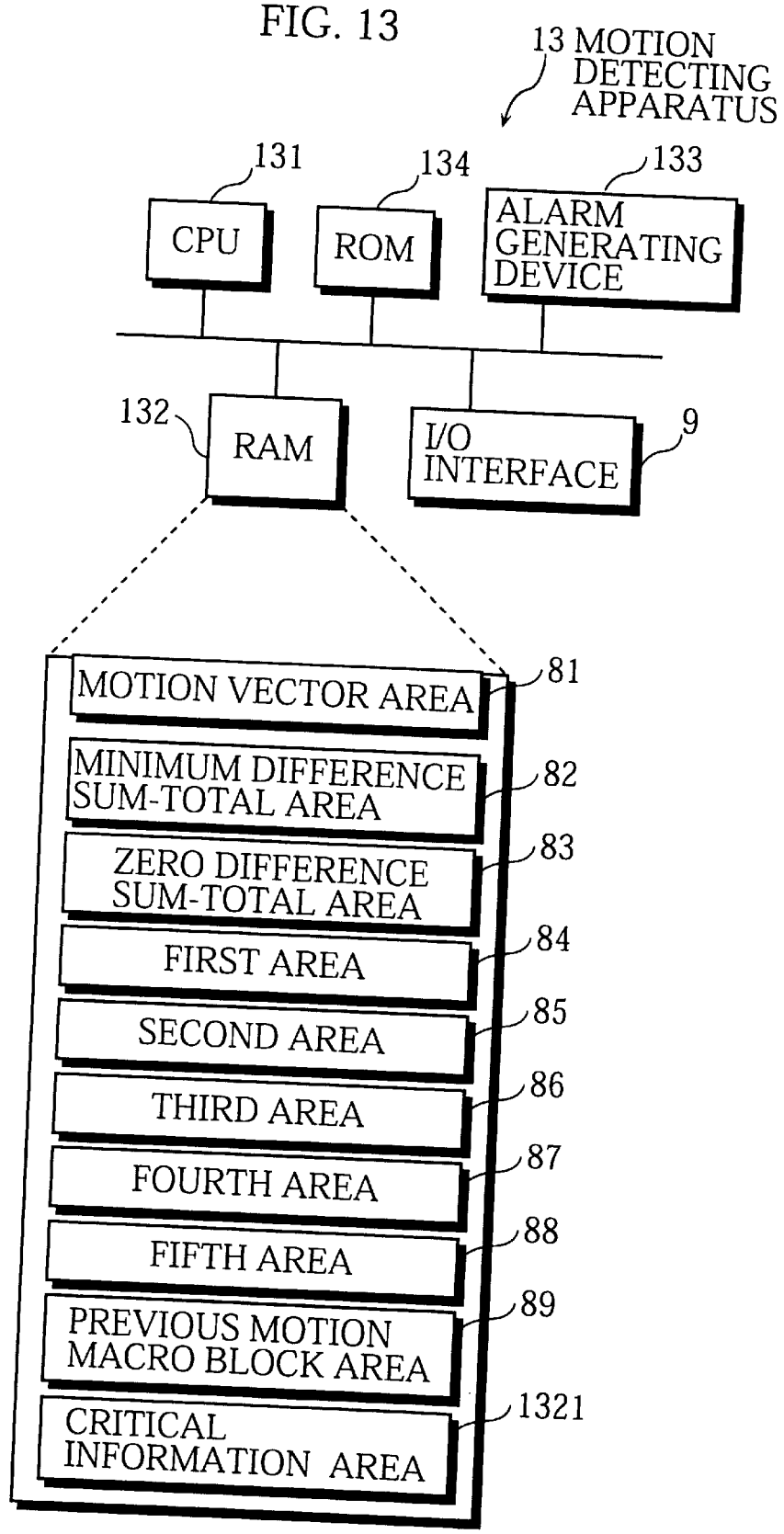
FIG. 13 is a block diagram showing the construction of a motion detecting apparatus 13 of the second embodiment of the present invention.

FIG. 13 is a block diagram showing the construction of the motion detecting apparatus 13 of the second embodiment.

In the figure, the motion detecting apparatus 13 is roughly made up of a CPU 131, a RAM 132, an alarm generating device 133, a ROM 134, and the I/O interface 9. Note here that construction elements which are the same as those in the first embodiment in FIG. 3 have been given the same reference numerals and their explanation has been omitted, so that the following explanation will focus on the differences with the first embodiment.

The alarm generating device 133 generates an alarm according to the control by the CPU 131.

The RAM 132 includes the motion vector area 81, the minimum difference sum-total area 82, the zero difference sum-total area 83, the first to fifth areas 84~88, the previous motion macro block area 89, and a critical information area 1321. Here, storage areas which have the same storage contents as those in the RAM 8 in FIG. 3 have been given the same reference numerals.

The critical information area 1321 stores critical area data and critical direction data.

The critical area data shows a position and size of a rectangle critical area set on a frame. The critical area is an area, such as the vicinity of a cash box in a store or an entrance of the store, that should be monitored with special care in images taken by the surveillance camera 1.

The critical direction data is made up of a horizontal component and vertical component of a vector that shows a critical direction. The critical direction is a direction of movement, such as a direction toward a cash box within a critical area set in the vicinity of the cash box or a direction from the outside into a store within a critical area set in the vicinity of an entrance, which should be especially paid attention to in monitoring.

Figure 14:
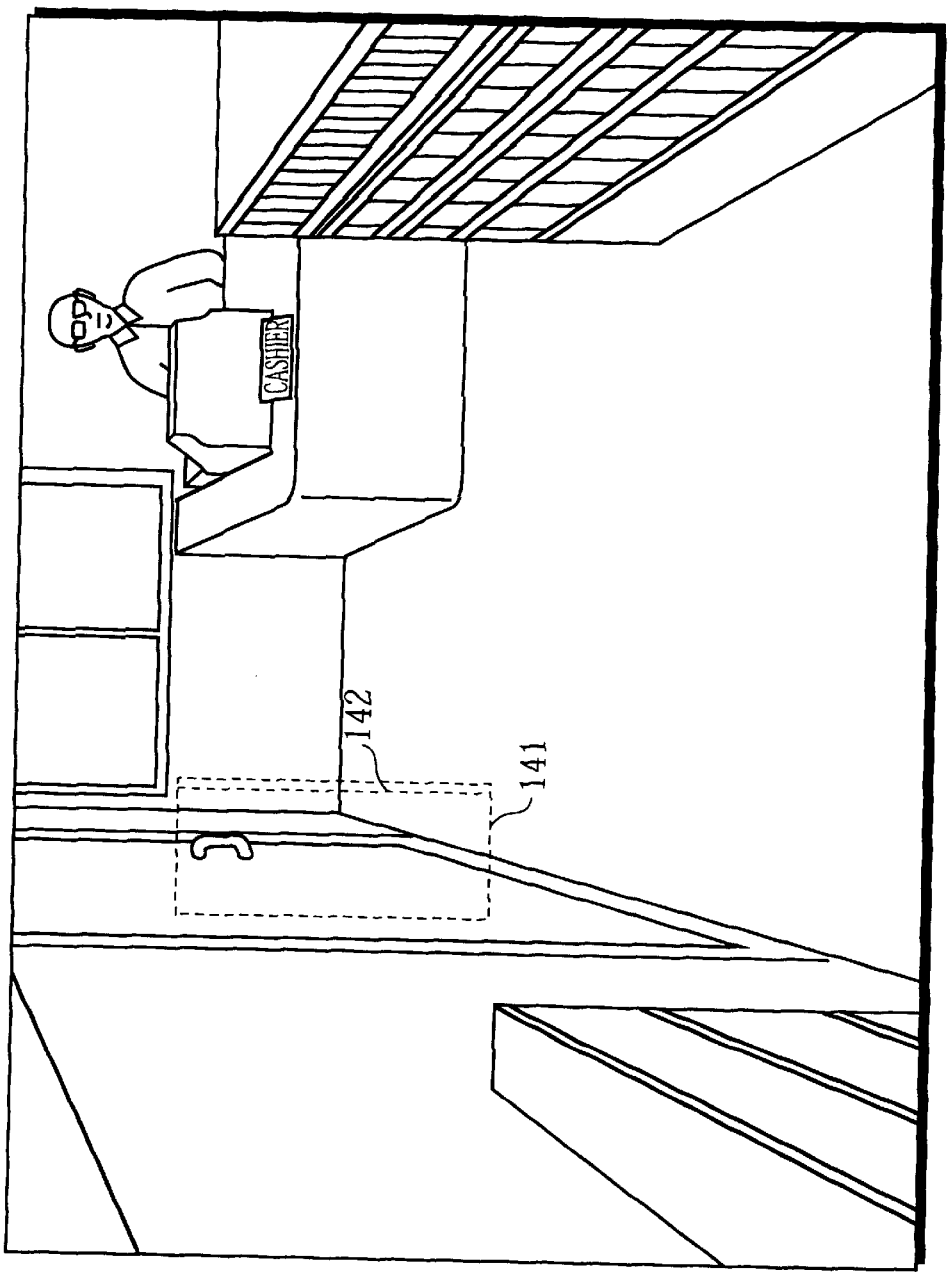
FIG. 14 shows an image taken by the surveillance camera 1 for the inside of a store and an entrance, with critical area and direction being set in the image.

FIG. 14 shows an image taken by the surveillance camera 1 for the inside of a store including an entrance, with a critical area and a critical direction being set in the image.

In the figure, a dotted box 141 is the critical area set on a frame for the vicinity of an entrance of a store, while a double dotted line 142 is the critical direction set in the critical area. Here, a rightward direction in the critical area has been set as the critical direction.

The ROM 134 stores a program describing alarm generation processing, in addition to the motion detecting program same as the ROM 6 in the first embodiment.

The CPU 131 executes this alarm generating program for each frame, as well as executing the motion detecting program same as the CPU 5 in the first embodiment. By executing these programs, the CPU 131 has the alarm generating device 133 generate an alarm when the following two conditions are met: whether at least one motion macro block detected as a result of the motion detection processing is present within the critical area; and whether an average direction of motion vectors of the motion macro blocks is approximately the same as the critical direction.

Figure 15:
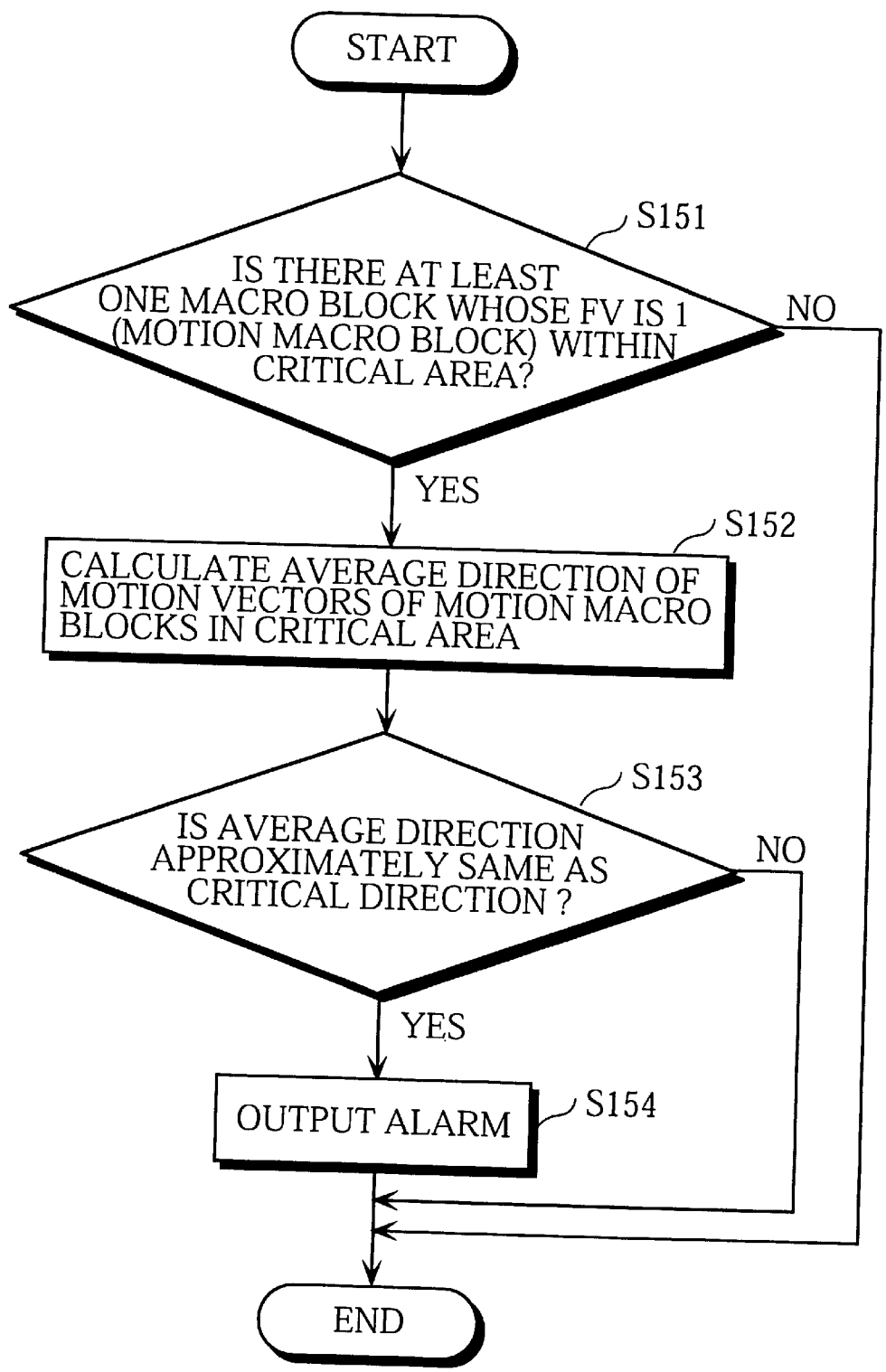
FIG. 15 is a flowchart showing the alarm generation processing.

FIG. 15 is a flowchart showing the alarm generation processing.

On completing the motion detection processing for one frame, the CPU 131 starts executing the alarm generation processing for the frame.

First, the CPU 131 judges whether at least one motion macro block exists within the critical area (S151). More specifically, the CPU 131 reads the critical area data from the critical information area 1321, and reads, from the fifth area 88, flags FV of macro blocks in the critical area shown by the read critical area data. The CPU 131 checks each of the flags whether FV=1. If at least one of the macro blocks satisfies FV=1, the CPU 131 proceeds to step S152. Otherwise, the alarm generation processing is terminated.

The CPU 131 finds an average direction of motion vectors of motion macro blocks with FV=1, by calculating a mean value of horizontal components MVx of the motion vectors and a mean value of vertical components MVy of the motion vectors (S152).

The CPU 131 then reads the critical direction data from the critical information area 1321 and judges whether the calculated mean values of MVx and MVy are respectively similar to horizontal and vertical components of the read critical direction data (S153). For example, if a difference between the mean value of MVx and the horizontal component of the critical direction data and a difference between the mean value of MVy and the vertical component of the critical direction data are both smaller than a threshold value (e.g. 20), the mean values are judged to be similar to the horizontal and vertical components of the critical direction data.

When it is judged that the average direction is approximately the same as the critical direction, the CPU 131 has the alarm generating device 133 generate an alarm (S154).

With this processing, if a person has entered into the store in the image shown in FIG. 14, the CPU 131 detects motion macro blocks showing movement of the person through the motion detection processing and then judges whether any of the motion macro blocks is present within the critical area 141. In the above situation, one or more motion macro blocks are present in the critical area, so that the CPU 131 further judges whether an average direction of motion vectors of the motion macro blocks is similar to the critical direction 142 (rightward direction). Here, the average direction is similar to the critical direction, so that the CPU 131 has the alarm generating device 133 generate an alarm.

Thus, the motion detecting apparatus 13 of the present embodiment generates an alarm when movement is detected within the critical area and the direction of the movement is approximately the same as the critical direction. Accordingly, by setting the critical area and direction in the vicinity of a cash box or an entrance, a range of monitoring is limited and so the workload for the security personnel is further reduced.

Modifications

While the motion detecting apparatus of the present invention has been explained based on the above embodiments, the present invention is not limited to such. For instance, the following modifications are possible.

(1) While the motion detection processing of the first embodiment shown in FIG. 4 has been performed in units of frames, the motion detection processing may be performed in units of k macro blocks.

In this case, k is determined as follows.

To judge whether the present macro block is a possible motion macro block in step S2, flags fI and motion vectors of macro blocks surrounding the present macro block are necessary.

Meanwhile, the MPEG video encoder 2 performs coding for each macro block in the rightward direction from the top row to the bottom row in a frame.

This being so, step S2 can be executed only after a flag FI and motion vector of a surrounding macro block on the bottom right of the present macro block are obtained. Assume the number of macro blocks in one row is 45, then the surrounding macro block on the bottom right of the present macro block is the 47th block to be coded after the present macro block. Accordingly, a value no less than 47 should be set as k.

(2) In the first embodiment, the following step S1A may be used instead of step S1.

<Step S1A>

① The CPU 5 calculates distributed values of 4 basic luminance blocks (8×8 pixels) which constitute the present macro block (16×16 pixels).

1. The CPU 5 calculates variance values of 4 basic luminance blocks (8×8 pixels) which constitute the present macro block (16×16 pixels).

2. The CPU 5 then finds a minimum value of the four variance values.

This minimum value is called an activity which has the property of becoming small in a flat area while become large in a nonflat area. This property is used to find out whether the present macro block is a macro block in a flat area. In other words, an activity indicates a scale of complexity of a block. Which is to say, the pattern of the block is more complex when the activity is larger. On the other hand, the pattern of the block is less complex when the activity is smaller. Whether the pattern of the block is complex or not corresponds to whether the block is a non-flat area or a flat area.

With the comparison between the minimum value and the first threshold value, it is possible to avoid the mistake of judging a macro block in a flat area as a possible motion macro block. Further, with the comparison between the absolute sum-total of MVx and MVy and the second threshold value, it is possible to avoid the mistake of judging a macro block with a small motion vector caused by image jitter as a possible motion macro block.

(3) Alternatively, the following step S1B may be used instead of step S1 in the first embodiment.

<Step S1B>

The CPU 5 judges the present macro block as a possible motion macro block when a motion vector of the present macro block is larger than a predetermined threshold value (such as 0).

(4) In the first embodiment and the above modifications (2) and (3), the sequence of steps S1~S5, steps S1A~S5, or steps S1B~S5 in the motion detection processing may be altered. It is also possible to use all of steps S1, S1A, S1B, and S2~S5 for the motion detection processing or to omit some of the steps. Further, the motion detection processing can be executed using only step S2.

(5) In the second embodiment, the CPU 131 may have the alarm generating device 133 generate an alarm when in each of a plurality of consecutive frames (e.g. 15 consecutive frames) at least one motion macro block is present within the critical area and an average direction of motion vectors of the motion macro blocks is approximately the same as the critical direction.

(6) While the critical direction data has shown the critical direction with horizontal and vertical components in the second embodiment, the critical direction data may simply show any of the upward direction, the downward direction, the rightward direction, and the leftward direction.

(7) In the case of (6), the CPU 131 may determine which of four directions (upward direction, downward direction, rightward direction, and leftward direction) the average direction of the motion vectors of the motion macro blocks belongs to, based on the mean values of MVx and MVy of the motion vectors within the critical area. In this case, the CPU 131 has the alarm generating device 133 generate an alarm if the determined direction matches the direction shown by the critical direction data.

For example, the CPU 131 may determine the average direction as follows:

if $|MVx|>|MVy|$ and $MVx>0$, then the average direction is the leftward direction;

if $|MVx|>|MVy|$ and $MVx\leq 0$, then the average direction is the rightward direction;

if $|MVx|\leq|MVy|$ and $MVy>0$, then the average direction is the upward direction; and if $|MVx|\leq|MVy|$ and $MVy\leq 0$, then the average direction is the downward direction.

(8) Concerning (7), if the surveillance camera 1 mounted on the ceiling is pointed in a diagonal downward direction, and the downward direction or the upward direction (that is, the direction toward the surveillance camera 1 or the direction away from the surveillance camera 1) is set as the critical direction, the CPU 131 may determine which of the four directions the average direction of the motion vectors belongs to, as follows:

if $|MVx|>|MVy|\times m$ and $MVx>0$, then the average direction is the leftward direction;

if $|MVx|>|MVy|\times m$ and $MVx\leq 0$, then the average direction is the rightward direction;

if $|MVx|\leq|MVy|\times m$ and $MVy>0$, then the average direction is the upward direction; and if $|MVx|\leq|MVy|\times m$ and $MVy\leq 0$, then the average direction is the downward direction.

Here, m is a value, such as 2, that changes depending on an angle of depression (an angle formed by the optical axis of a lens with the ceiling) of the surveillance camera 1. For example, the shallower the angle of depression, the larger value is to be set as m, since up-and-down motion of a motion macro block becomes smaller than side-to-side motion as the angle of depression becomes shallower.

(9) In the first embodiment, the MPEG video encoder 2 may determine a coding mode for each macro block based on a detection result of the motion detecting apparatus 4.

There are two types of coding mode that are a motion compensating prediction mode and an intra-coding mode.

The motion compensating prediction mode is to perform DCT coding and quantization on a prediction error which is a difference between the reference block and the target block. This mode has a high coding efficiency when high correlation exists between the frames, such as continuous movement of an object.

The intra-coding mode is to perform DCT coding and quantization on the target block and is effective when correlation does not exist between the frames, such as scene change.

The quantizing unit 718 may determine the coding mode for the target block as follows.

① Calculate a distributed value VAR of a luminance block of the target block.

② Calculate a mean.square prediction error MSE for luminance signals of the reference block.

③ Select the intra-coding mode when VAR<MSE and MSE>64. Otherwise, provisionally select the motion compensating prediction mode.

④ Acquire FV of the target block from the motion detecting apparatus 4.

⑤ If FV=0 (static macro block) and the motion compensating prediction mode has been provisionally selected in ③, change the coding mode to the intra-coding mode.

As a result, the MPEG video encoder 2 can avoid coding static macro blocks by the motion compensating prediction mode.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A motion detecting apparatus for processing coded images with motion vectors of a target area to determine movement of an object in the target area comprising:
    a first judging unit for (a) computing, for each of a plurality of blocks, a scale of complexity of a pattern of the block, and (b) judging the block as a possible motion block if the scale of complexity is larger than a first threshold value and a magnitude of a motion vector representing the block is larger than a second threshold value; and
    a second judging unit for further judging the blocks that meet or exceed the threshold values of the first judging unit as a motion block when a direction and magnitude of the block approximates the direction and magnitude of a predetermined number of surrounding blocks wherein the determination of a motion block is indicative of a moving object.

2. The motion detecting apparatus of claim 1,
wherein the second judging unit includes:
    reading means for reading motion vectors of blocks which are judged as possible motion blocks among the blocks surrounding the present block, from the memory;
    first detecting means for detecting motion vectors, among the read motion vectors, whose directions are roughly similar to a direction of the motion vector of the present block;
    second detecting means for detecting motion vectors, among the read motion vectors, whose magnitudes are similar to a magnitude of the motion vector of the present block; and
    determining means for determining whether the present block is the motion block, depending on a number of motion vectors detected by both the first detecting means and the second detecting means.

3. The motion detecting apparatus of claim 2,
wherein the first detecting means judges, when signs of a horizontal component and a vertical component of any of the read motion vectors respectively match signs of a horizontal component and a vertical component of the motion vector of the present block, the read motion vector to have a direction roughly similar to the direction of the motion vector of the present block, and
wherein the second detecting means judges, when a difference between a magnitude of any of the read motion vectors and the magnitude of the motion vector of the present block is smaller than a threshold value, the read motion vector to have a magnitude similar to the magnitude of the motion vector of the present block.

4. The motion detecting apparatus of claim 3,
wherein the determining means determines the present block as the motion block when $$M \geq N/k$$

where N is a number of motion vectors read by the reading means, M is the number of motion vectors detected by both the first detecting means and the second detecting means, and k is a constant no less than 1.

5. The motion detecting apparatus of claim 4, further comprising:
    area storing means for storing a critical area set in a frame;
    area judging means for judging whether at least one of motion blocks found by the second judging unit is present within the critical area; and
    alarm generating means for generating an alarm depending on a judgment result of the area judging means.

6. The motion detecting apparatus of claim 5,
wherein the area storing means further stores a critical direction corresponding to the critical area, and
wherein the area judging means judges, when the motion blocks are present within the critical area, whether an average direction of motion vectors of the motion blocks is roughly similar to the critical direction.

7. The motion detecting apparatus of claim 6,
wherein the alarm generating means generates the alarm when the area judging means judges that at least one motion block whose motion vector has an average direction roughly similar to the critical direction is present within the critical area in each of a predetermined number of consecutive frames.

8. A motion detecting apparatus, connected to a video encoder which sequentially compression-codes images inputted from a camera, for detecting motion of objects in the images, the motion detecting apparatus comprising:
    acquiring means for acquiring a motion vector calculated by the video encoder for each of a plurality of blocks from the video encoder together with a first difference sum-total and a second difference sum-total of the block, and storing the motion vector, the first difference sum-total, and the second difference sum-total of the block in a memory, the first difference sum-total, expressed as AE0, being a sum-total of differences in luminance values of corresponding pixels between the block and a rectangle area which is present in a reference frame and corresponds to the block, and the second difference sum-total, expressed as AE, being a sum-total of differences in luminance values of corresponding pixels between the block and a rectangle area which is present in the reference frame and is directed to by the motion vector of the block;
    first judging means for judging blocks, among the plurality of blocks, which each satisfy $$AE0-AE > \alpha$$

possible motion blocks, α being a threshold value; and
    second judging means for judging, when a motion vector of a present block and motion vectors of blocks surrounding the present block have non-random directions and non-random magnitudes, the present block as a motion block,
    wherein the present block is selected from the possible motion blocks one by one, and
    wherein the motion block shows a part of an object in motion.

9. The motion detecting apparatus of claim 8,
wherein the second judging means includes:
    reading means for reading motion vectors of blocks which are judged as possible motion blocks among the blocks surrounding the present block, from the memory;

first detecting means for detecting motion vectors, among the read motion vectors, whose directions are roughly similar to a direction of the motion vector of the present block;

second detecting means for detecting motion vectors, among the read motion vectors, whose magnitudes are similar to a magnitude of the motion vector of the present block; and determining means for determining whether the present block is the motion block, depending on a number of motion vectors detected by both the first detecting means and the second detecting means.

10. The motion detecting apparatus of claim 9, wherein the first detecting means judges, when signs of a horizontal component and a vertical component of any of the read motion vectors respectively match signs of a horizontal component and a vertical component of the motion vector of the present block, the read motion vector to have a direction roughly similar to the direction of the motion vector of the present block, and wherein the second detecting means judges, when a difference between a magnitude of any of the read motion vectors and the magnitude of the motion vector of the present block is smaller than a threshold value, the read motion vector to have a magnitude similar to the magnitude of the motion vector of the present block.

11. The motion detecting apparatus of claim 10, wherein the determining means determines the present block as the motion block when $$M \geq N/k$$

where N is a number of motion vectors read by the reading means, M is the number of motion vectors detected by both the first detecting means and the second detecting means, and k is a constant no less than 1.

12. The motion detecting apparatus of claim 8, further comprising:

area storing means for storing a critical area set in a frame;

area judging means for judging whether at least one of motion blocks found by the second judging means is present within the critical area; and alarm generating means for generating an alarm depending on a judgement result of the area judging means.

13. The motion detecting apparatus of claim 12, wherein the area storing means further stores a critical direction corresponding to the critical area, and wherein the area judging means judges, when the motion blocks are present within the critical area, whether an average direction of motion vectors of the motion blocks is roughly similar to the critical direction.

14. The motion detecting apparatus of claim 13, wherein the alarm generating means generates the alarm when the area judging means judges that at least one motion block whose motion vector has an average direction roughly similar to the critical direction is present within the critical area in each of a predetermined number of consecutive frames.

15. The motion detecting apparatus of claim 8, further comprising third judging means for rejudging, when the present block judged by the second judging means as the motion block satisfies $$|AE0-AE|/(|MVx|+|MVy|+1) \geq \beta$$

the present block as the motion block, where MVx is a horizontal component of the motion vector of the present block, MVy is a vertical component of the motion vector of the present block, and $\beta$ is a threshold value.

16. The motion detecting apparatus of claim 15, wherein the second judging means includes:

reading means for reading motion vectors of blocks which are judged as possible motion blocks among the blocks surrounding the present block, from the memory;

first detecting means for detecting motion vectors, among the read motion vectors, whose directions are roughly similar to a direction of the motion vector of the present block;

second detecting means for detecting motion vectors, among the read motion vectors, whose magnitudes are similar to a magnitude of the motion vector of the present block; and determining means for determining whether the present block is the motion block, depending on a number of motion vectors detected by both the first detecting means and the second detecting means.

17. The motion detecting apparatus of claim 16, wherein the first detecting means judges, when signs of a horizontal component and a vertical component of any of the read motion vectors respectively match signs of the horizontal component and the vertical component of the motion vector of the present block, the read motion vector to have a direction roughly similar to the direction of the motion vector of the present block, and wherein the second detecting means judges, when a difference between a magnitude of any of the read motion vectors and the magnitude of the motion vector of the present block is smaller than a threshold value, the read motion vector to have a magnitude similar to the magnitude of the motion vector of the present block.

18. The motion detecting apparatus of claim 17, wherein the determining means determines the present block as the motion block when $$M \geq N/k$$

where N is a number of motion vectors read by the reading means, M is the number of motion vectors detected by both the first detecting means and the second detecting means, and k is a constant no less than 1.

19. The motion detecting apparatus of claim 15, further, comprising:

area storing means for storing a critical area set in a frame;

area judging means for judging whether at least one of motion blocks rejudged by the third judging means is present within the critical area; and alarm generating means for generating an alarm depending on a judgement result of the area judging means.

20. The motion detecting apparatus of claim 19, wherein the area storing means further stores a critical direction corresponding to the critical area, and wherein the area judging means judges, when the motion blocks are present within the critical area, whether an average direction of motion vectors of the motion blocks is roughly similar to the critical direction.

21. The motion detecting apparatus of claim 20,
wherein the alarm generating means generates the alarm when the area judging means judges that at least one motion block whose motion vector has an average direction roughly similar to the critical direction is present within the critical area in each of a predetermined number of consecutive frames.

22. The motion detecting apparatus of claim 15, further comprising
fourth judging means for rejudging, when the blocks surrounding the present block rejudged by the third judging means as the motion block are not motion blocks and the present block satisfies $$|MVx|+|MVy| \leq \gamma$$

the present block as the motion block, $\gamma$ being a threshold value,
wherein the fourth judging means also rejudges the present block as the motion block when at least one of the blocks surrounding the present block is a motion block.

23. The motion detecting apparatus of claim 22,
wherein the second judging means includes:
reading means for reading motion vectors of blocks which are judged as possible motion blocks among the blocks surrounding the present block, from the memory;
first detecting means for detecting motion vectors, among the read motion vectors, whose directions are roughly similar to a direction of the motion vector of the present block;
second detecting means for detecting motion vectors, among the read motion vectors, whose magnitudes are similar to a magnitude of the motion vector of the present block; and
determining means for determining whether the present block is the motion block, depending on a number of motion vectors detected by both the first detecting means and the second detecting means.

24. The motion detecting apparatus of claim 23,
wherein the first detecting means judges, when signs of a horizontal component and a vertical component of any of the read motion vectors respectively match signs of the horizontal component and the vertical component of the motion vector of the present block, the read motion vector to have a direction roughly similar to the direction of the motion vector of the present block, and
wherein the second detecting means judges, when a difference between a magnitude of any of the read motion vectors and the magnitude of the motion vector of the present block is smaller than a threshold value, the read motion vector to have a magnitude similar to the magnitude of the motion vector of the present block.

25. The motion detecting apparatus of claim 24,
wherein the determining means determines the present block as the motion block when $$M \geq N/k$$

where N is a number of motion vectors read by the reading means, M is the number of motion vectors detected by both the first detecting means and the second detecting means, and k is a constant no less than 1.

26. The motion detecting apparatus of claim 22, further comprising:
area storing means for storing a critical area set in a frame;
area judging means for judging whether at least one of motion blocks rejudged by the fourth judging means is present within the critical area; and
alarm generating means for generating an alarm depending on a judgement result of the area judging means.

27. The motion detecting apparatus of claim 26,
wherein the area storing means further stores a critical direction corresponding to the critical area, and
wherein the area judging means judges, when the motion blocks are present within the critical area, whether an average direction of motion vectors of the motion blocks is roughly similar to the critical direction.

28. The motion detecting apparatus of claim 27,
wherein the alarm generating means generates the alarm when the area judging means judges that at least one motion block whose motion vector has an average direction roughly similar to the critical direction is present within the critical area in each of a predetermined number of consecutive frames.

29. The motion detecting apparatus of claim 22, further comprising
fifth judging means for rejudging, when in a frame preceding a frame of the present block at least one motion block is included in blocks made up of: a block existing in a same position as the present block rejudged by the fourth judging means as the motion block; and blocks surrounding the block, the present block as the motion block.

30. The motion detecting apparatus of claim 29,
wherein the second judging means includes:
reading means for reading motion vectors of blocks which are judged as possible motion blocks among the blocks surrounding the present block, from the memory;
first detecting means for detecting motion vectors, among the read motion vectors, whose directions are roughly similar to a direction of the motion vector of the present block;
second detecting means for detecting motion vectors, among the read motion vectors, whose magnitudes are similar to a magnitude of the motion vector of the present block; and
determining means for determining whether the present block is the motion block, depending on a number of motion vectors detected by both the first detecting means and the second detecting means.

31. The motion detecting apparatus of claim 30,
wherein the first detecting means judges, when signs of a horizontal component and a vertical component of any of the read motion vectors respectively match signs of the horizontal component and the vertical component of the motion vector of the present block, the read motion vector to have a direction roughly similar to the direction of the motion vector of the present block, and
wherein the second detecting means judges, when a difference between a magnitude of any of the read motion vectors and the magnitude of the motion vector of the present block is smaller than a threshold value, the read motion vector to have a magnitude similar to the magnitude of the motion vector of the present block.

32. The motion detecting apparatus of claim 31,
wherein the determining means determines the present block as the motion block when $M \geq N/k$ where N is a number of motion vectors read by the reading means, M is the number of motion vectors detected by both the first detecting means and the second detecting means, and k is a constant no less than 1.

33. The motion detecting apparatus of claim 29, further comprising:

area storing means for storing a critical area set in a frame;

area judging means for judging whether at least one of motion blocks rejudged by the fifth judging means is present within the critical area; and alarm generating means for generating an alarm depending on a judgement result of the area judging means.

34. The motion detecting apparatus of claim 33, wherein the area storing means further stores a critical direction corresponding to the critical area, and wherein the area judging means judges, when the motion blocks are present within the critical area, whether an average direction of motion vectors of the motion blocks is roughly similar to the critical direction.

35. The motion detecting apparatus of claim 34, wherein the alarm generating means generates the alarm when the area judging means judges that at least one motion block whose motion vector has an average direction roughly similar to the critical direction is present within the critical area in each of a predetermined number of consecutive frames.

36. A computer-readable storage medium storing a motion detecting program for detecting, through use of motion vectors outputted from a video encoder which sequentially compression-codes images inputted from a camera, motion of objects in the images, the motion detecting program comprising:

an acquiring step for acquiring a motion vector calculated by the video encoder for each of a plurality of blocks from the video encoder together with a first difference sum-total and a second difference sum-total of the block, and storing the motion vector, the first difference sum-total, and the second difference sum-total of the block in a memory, the first difference sum-total, expressed as AE0, being a sum-total of differences in luminance values of corresponding pixels between the block and a rectangle area which is present in a reference frame and corresponds to the block, and the second difference sum-total, expressed as AE, being a sum-total of differences in luminance values of corresponding pixels between the block and a rectangle area which is present in the reference frame and is directed to by the motion vector of the block;

a first judging step for judging blocks, among the plurality of blocks, which each satisfy $AE0-AE > \alpha$ as possible motion blocks, $\alpha$ being a threshold value; and a second judging step for judging, when a motion vector of a present block and motion vectors of blocks surrounding the present block have non-random directions and non-random magnitudes, the present block as a motion block, wherein the present block is selected from the possible motion blocks one by one, and wherein the motion block shows a part of an object in motion.

37. A motion detecting apparatus for detecting motion of an object in an image, comprising:

acquiring means for acquiring a motion vector calculated for each of a plurality of blocks by inter-frame motion compensating prediction, and a first difference sum-total and a second difference sum-total of the block, and storing the motion vector, the first difference sum-total, and the second difference sum-total of the block in a memory, the first difference sum-total, expressed as AE0, being a sum-total of differences in luminance values of corresponding pixels between the block and a target area which is present in a reference frame and corresponds to the block, and the second difference sum-total, expressed as AE, being a sum-total of differences in luminance values of corresponding pixels between the block and the target area which is present in the reference frame and is directed to by the motion vector of the block;

first judging means for judging blocks, among the plurality of blocks, which each satisfy an equation:

$|AE0-AE| > \alpha$ as possible motion blocks, $\alpha$ being a threshold value;

second judging means for judging, when a motion vector of a present block and motion vectors of blocks surrounding the present block have non-random directions and non-random magnitudes, the present block as a motion block, the present block being selected from the possible motion blocks one by one, and the motion block showing a part of an object in motion; and third judging means for rejudging, when the present block judged by the second judging means as the motion block satisfies an equation:

$|AE0-AE|/(|MVx|+|MVy|+1) \geq \beta$ the present block as the motion block, where MVx is a horizontal component of the motion vector of the present block, MVy is a vertical component of the motion vector of the present block, and $\beta$ is a threshold value.

38. A computer-readable storing medium storing a motion detecting program for detecting, through use of motion vectors outputted from a video encoder which sequentially compression-codes images inputted from a camera, motion of objects in the images, the motion detecting program comprising:

an acquiring step for acquiring a plurality of motion vectors calculated by the video encoder respectively for a plurality of blocks and storing the plurality of motion vectors of the respective plurality of blocks in a memory;

a first judging step for (a) computing, for each of a plurality of blocks, a scale of complexity of a pattern of the block, and (b) judging the block as a possible motion block if the scale of complexity is larger than a first threshold value and a magnitude of a motion vector representing the block is larger than a second threshold value, and a second judging step for judging the blocks that meet or exceed the threshold values of the first judging step as a motion block when a direction and magnitude of the block approximates the direction and magnitude of a predetermined number of surrounding blocks wherein the determination of a motion block is indicative of a moving object wherein the present block is selected from the possible motion blocks one by one, and wherein the motion block shows a part of an object in motion.

39. A motion detecting method for detecting, through use of motion vectors outputted from a video encoder which sequentially compression-codes images inputted from a camera, motion of objects in the images, the motion detecting method comprising:

an acquiring step for acquiring a plurality of motion vectors calculated by the video encoder respectively for a plurality of blocks and storing the plurality of motion vectors of the respective plurality of blocks in a memory;

a first judging step for (a) computing, for each of a plurality of blocks, a scale of complexity of a pattern of the block, and (b) judging the block as a possible motion block if the scale of complexity is larger than a first threshold value and a magnitude of a motion vector representing the block is larger than a second threshold value; and a second judging step for judging the blocks that meet or exceed the threshold values of the first judging step as a motion block when a direction and magnitude of the block approximates the direction and magnitude of a predetermined number of surrounding blocks wherein the determination of a motion block is indicative of a moving object;

wherein the present block is selected from the possible motion blocks one by one, and wherein the motion block shows a part of an object in motion.

40. A motion detecting apparatus for processing coded images with motion vectors of a target area to determine movement of an object in the target area comprising:

a first judging unit for processing motion vectors representing predetermined blocks that collectively represent a portion of the target area to determine those blocks that are possible motion blocks indicative of a moving object by comparing a value representative of a block to a minimum flat area threshold value, to distinguish a block in a flat area of the target area from those in a non-flat area; and a second judging unit for further judging the blocks that meet or exceed the flat area threshold value for judging a block as a motion block when a direction and magnitude of the block approximates the direction and magnitude of a predetermined number of surrounding blocks wherein the determination of a motion block is indicative of a moving object.

* * * * *

UNITED STATES PATENT AND TRADEMARK OFFICE
CERTIFICATE OF CORRECTION

PATENT NO. : 6,512,537 B1
DATED : January 28, 2003
INVENTOR(S) : Kazuhito Shimizu et al.

It is certified that error appears in the above-identified patent and that said Letters Patent is hereby corrected as shown below:

<u>Column 20,</u>
Line 52, before "possible", insert -- as --

<u>Column 26,</u>
Line 61, after "value" delete ","and insert -- ; --

Signed and Sealed this

Thirtieth Day of December, 2003

JAMES E. ROGAN
*Director of the United States Patent and Trademark Office*